US007917310B2

(12) United States Patent
Pearce et al.

(10) Patent No.: US 7,917,310 B2

(45) Date of Patent: Mar. 29, 2011

(54) FAULT DETECTOR AND METHOD OF DETECTING FAULTS

(75) Inventors: Daniel A. Pearce, Acton (GB); Anthony Thomas Harcombe, Richmond (GB)

(73) Assignee: Delphi Technologies Holding S.arl, Troy, MI (US)

( * ) Notice: Subject to any disclaimer, the term of this patent is extended or adjusted under 35 U.S.C. 154(b) by 154 days.

(21) Appl. No.: 12/291,672

(22) Filed: Nov. 12, 2008

(65) Prior Publication Data

US 2009/0132180 A1 May 21, 2009

(30) Foreign Application Priority Data

Nov. 15, 2007 (EP) .................................... 07254464

(51) Int. Cl.
*G06F 11/30* (2006.01)
*G21C 17/00* (2006.01)

(52) U.S. Cl. ......................................... 702/38; 702/185

(58) Field of Classification Search .................... 702/38, 702/150, 185
See application file for complete search history.

(56) References Cited

U.S. PATENT DOCUMENTS 5,245,501 A 9/1993 Locher et al. ................. 361/154
5,835,330 A * 11/1998 Kirschner et al. ............ 361/152
5,880,920 A 3/1999 Fischer et al. ................ 361/187
2005/0066940 A1 3/2005 Sheikh et al. ................. 123/446
2008/0092853 A1 * 4/2008 Harcombe et al. ............ 123/472

FOREIGN PATENT DOCUMENTS

GB 2 279 829 1/1995
WO 94/13991 6/1994

OTHER PUBLICATIONS

International Search Report dated Apr. 24, 2008.

* cited by examiner

*Primary Examiner* — Michael P Nghiem
(74) *Attorney, Agent, or Firm* — Thomas N. Twomey

(57) ABSTRACT

A fault detector for detecting valve movement of a valve in a fuel injector of an engine system, the valve includes an electromagnetic actuator arranged to move the valve between first and second valve positions, the engine system includes a sensor for sensing a current through the actuator. The detector includes a controller arranged to control the sensor; receive sensor data related to the current through the actuator; analyze the received data for current discontinuities; and output a valve movement signal dependent upon the current discontinuities. The controller is arranged to sense current during a finite sampling window, move the sampling window from a first window position to a later window position for one or more subsequent injection events; determine a new sampling window position on based a valve movement signal output the two preceding windows; and feedback the new sampling window position for a subsequent injection event.

22 Claims, 15 Drawing Sheets

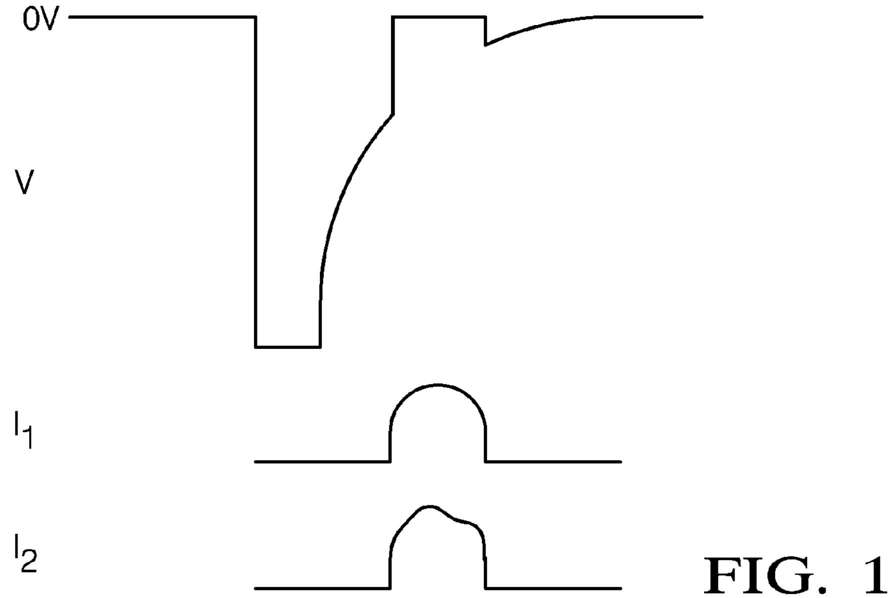
FIG. 1
FIG. 3 A
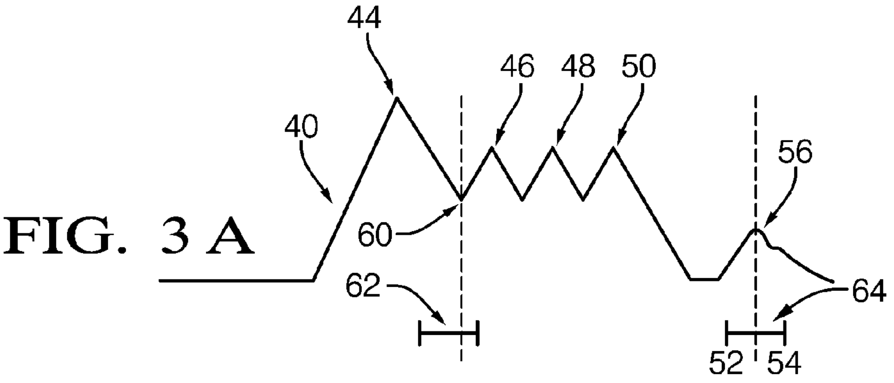
FIG. 3 B
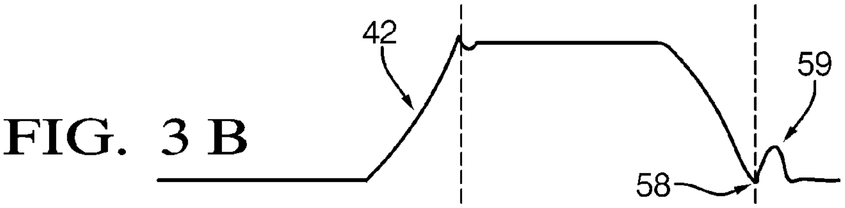
FIG. 3 C
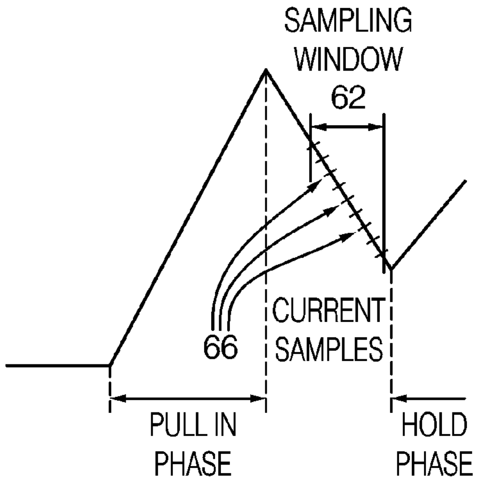

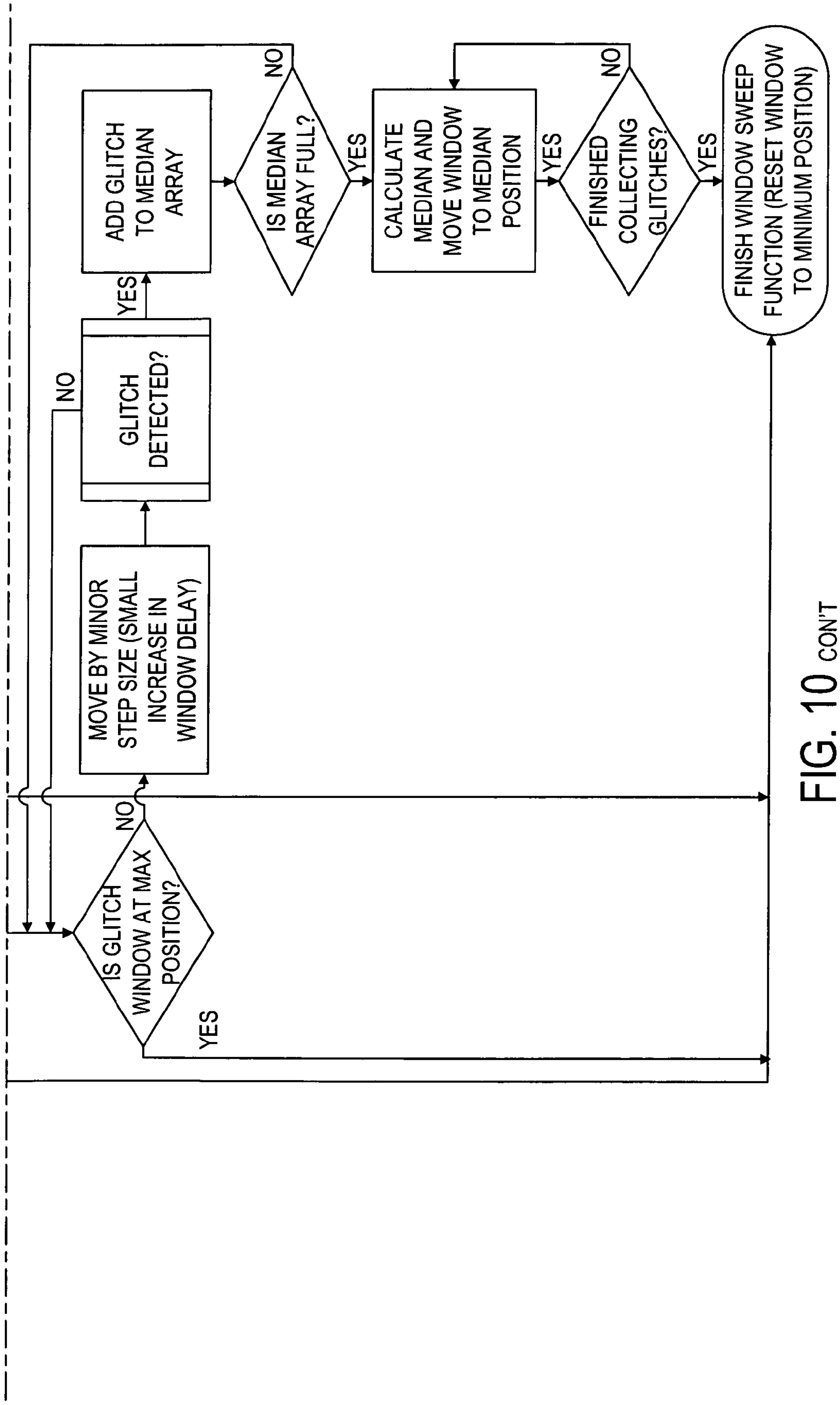
FIG. 10 CON'T (NOTE THAT DATA POINT LABELS HAVE BEEN ROUNDED TO NEAREST 2 DECIMAL PLACES)

FAULT DETECTOR AND METHOD OF DETECTING FAULTS

TECHNICAL FIELD

The present invention relates to a fault detector and method of detecting faults. More particularly, the present invention relates to the detection of valve movement of a valve in a fuel injector of an engine system via detection and analysis of discontinuities ("faults") in the current through a control actuator of the valve.

BACKGROUND TO THE INVENTION

In electronically-controlled fuel injection systems, actuator controlled valves (e.g. solenoid valves) are used to control the flow of fuel within the injector, and hence, timing, pressure and quantity of fuel injected into the engine cylinders.

For single-valve injection systems, such as Electronic Unit Injectors (EUIs) and Electronic Unit Pumps (EUPs) a single solenoid valve—known as the "Spill Valve"—is used to control the point, or set of conditions, at which fuel pressure within the injector volume begins to increase. If the valve is open, fuel will be allowed to "spill" to low pressure (the fuel tank). Alternatively, if the valve is closed, the mass of fuel within the injector will undergo pressurization due to the advancing cam-driven plunger reducing the injector volume. Injection of fuel into the engine's cylinder occurs once the fuel pressure within the injector becomes greater than the spring pressure that holds the injector needle closed against its seat, resulting in "injector needle lift". Fuel injection will continue until the Spill Valve re-opens, spilling fuel to low pressure, resulting in the spring forcing the injector needle to return to its closed position. In this situation, the fuel pressure necessary to lift the needle at the start of injection (known as Nozzle Opening Pressure, or NOP) is related to the force within the needle spring (i.e. spring NOP).

In the case of twin-valve injection systems, a secondary solenoid valve is used to regulate the control pressure applied to the back of the injector needle and, hence, NOP can exceed the needle spring pressure (i.e. variable NOP). This solenoid valve is known as the "Needle Control Valve". It is a "three-way" valve, in that it exposes the port, whose pressure is to be controlled, to either a high control pressure (when de-energized) or a drain pressure (when energized).

Similar actuator controlled valves are used in common rail fuel injection systems too.

This invention refers to the control of both single and twin valve injection systems.

Valve movement is facilitated by means of an actuator that comprises an electromagnetic stator (a series of coil windings wound around a stator core), through which a current is passed to activate an armature. A valve pin is directly attached to the armature, and subsequent movement of the armature/valve assembly is used to control flow of fuel within the injector. The valve pin is held in the open position by a return spring, therefore any electromagnetic force induced by the solenoid coil is working against the spring to close the valve.

The control of the solenoid valve is divided into two general categories, a so called "pull-in" phase and a "hold phase".

During the pull-in phase, the armature of the solenoid-controlled valve is caused to close by the application of a first current level through the solenoid coil. During the hold phase a second, lower current level is supplied to the solenoid coil to keep the valve closed.

The driving current provided during the pull-in phase is supplied by a capacitor. The capacitor and associated circuitry provide a further voltage supply means (in addition to the battery) and are hereinafter collectively referred to as the "boost circuit".

The driving current provided during the hold phase is supplied by applying the standard battery voltage across the solenoid coil in order to provide the second current level. A so-called "chopping circuit" controls the application of the battery voltage so that the required drive current supplied to the actuator throughout the injection is between defined upper and lower hold thresholds.

As the battery voltage decreases, the chopping circuit may constantly apply the battery voltage to the solenoid coil during the entire hold phase of injection in order to maintain the driving current to the solenoid between the desired threshold levels.

In order to maintain precise fuelling using fuel injection engines it is required that either the performance of an individual injector is known or the tolerance band of a group of injectors is well known within tight limits. As a consequence this means that factory limits during production must be tight and engine testing must be sensitive enough to pick up the performance of the injector(s).

However, no matter how good the initial set up, there will be a drift in performance over the life of the injector as components bed in or wear out. In order to address the problem of component performance drift the FIE has to have internal control systems to compensate and such control systems need to be able to detect changes in injector performance.

For electromagnetically controlled valves as described above, the control system may detect changes in valve performance through the detection of changes in the current profile of the coil used to drive valve motion.

The current seen on a coil has a characteristic profile due to the induction effect of a decaying magnetic field and a valve moving through that field affects the current profile (this effect is generally termed back EMF). In particular, when the valve reaches the end of its travel, it will stop moving or bounce off of its seat/stop and this change can be detected as a discontinuity, or "fault", in the current profile.

Since the change in current profile corresponds to the valve meeting its stop and the valve at this point in its actuated state, it follows that what is being detected correlates with the physical events triggered by the actuated valve. Therefore, the change in the characteristic profile of the current provides an effective way to measure the start of injection or pressure rise without reference to external sensors.

A fault detection system that is able to reliably and efficiently detect the changes in the current profile can then relate the change in the current profile to physical events such as the start/end of pressure and start/end of injection (delivery). This gives initial performance benefits as well as allowing the system to self correct if there are changes in valve response. It follows that one of the main disadvantages of the system without fault is that there is no way to control the injector timing to compensate for any changes that occur over the life of the system. It is known that the injector components can undergo two significant changes after installation, namely the bedding in period and wear caused during normal operation. These two conditions mean that the injector performance deviates from the factory set values over its service lifetime.

There is currently no method to track changes in the valve movement characteristics in situ. Presently the only way to compare the valve performance is by removal from the application and testing in a controlled environment with reference to initial factory data (a 'before and after' type test).

Existing fault detection relies on sampling either the voltage or current through the coil during a sampling window and then examining the measurements to determine when the valve has stopped moving. This method of fault detection has a number of shortcomings and performance limitations. One of these limitations is that the fault/sampling window actually adds energy to the system (since a voltage is artificially applied so as to drive additional current into the system) and as such is influencing the system performance. More specifically, the extra energy can extend the time the valve is actuated by adding enough energy to effectively re-actuate the valve or lead to erratic valve timing where the force/energy balance is close to sensitive limits.

Fault windows may also have the problem that the window position has an influence on the position of the current discontinuity that is recorded. The closer the fault ("the discontinuity") is to the end of the fault window, the more energy has entered the coil windings and as such this will tend to retard the natural progress of the valve (partial re-energization). This means the greater the window length before the fault, the greater the magnitude of the imposed error.

As a result of the effects of window position, any detection routine must be able to rapidly and efficiently evaluate the available data and make a fault decision in the shortest possible time. This means that the detection criteria must be mathematically as simple as possible and be paired with a sufficiently powerful CPU to reduce the negative impacts of having the fault window in the wrong position. Ideally, a decision on the fault status should be decided on a shot to shot basis for the best performance benefits.

Due to the operating environment of the injectors, there is typically a degree of electrical noise (typically high frequency RF) present in the engine system. Appropriate sampling methods and hardware acquisition can reduce this noise to a minimum but a successful fault strategy must also incorporate some form of noise filtering or rejection. Existing methods for fault detection that include digital signal processing are either too slow (mathematically intensive) to avoid the error due to window position or they are insufficiently effective at eliminating noise induced errors.

Since the fault window is a deviation from the natural current decay by forced voltage application, there will always be a measured (i.e. non zero) current associated with it. A key difficulty in prior art fault detection systems is discriminating between a valid fault and a non valid event. In other words, the detection routine must be able to distinguish the difference between a natural current decay profile and a profile with the effects of a change in motion by the armature.

The difference between these two profiles can be subtle and traditionally has been difficult to determine mathematically for the wide range of different possible valve motions. This is further complicated by the range of possible coil response profiles that all give slightly different current decay shapes.

It is therefore an object of the present invention to provide a fault detector and an associated method of detecting valve movements that substantially overcomes or mitigates the above mentioned problems.

SUMMARY OF THE INVENTION

According to a first aspect of the invention, there is provided a fault detector for detecting valve movement of a valve in a fuel injector of an engine system, the valve comprising an electromagnetic actuator that is arranged to move the valve between first and second valve positions during a valve cycle and the engine system comprising a sensor for sensing a current through the actuator. The detector comprises a controller arranged to control the sensor; inputs for receiving from the sensing means data related to the current through the actuator; a processor arranged to analyze the received data for current discontinuities; outputs for outputting a valve movement signal (e.g. fault detect signal) in dependence upon the current discontinuities determined by the processor. The controller is arranged to enable the sensor during a finite sampling window and is further arranged (i) to move the sampling window from a first window position for a first injection event to a progressively later window position for one or more subsequent injection events, (ii) to determine a new sampling window position on the basis of a valve movement signal output for at least two of the preceding window positions, and (iii) to feedback the new sampling window position for a subsequent injection event.

The present invention provides a fault detector wherein the current through the actuator of a valve in an engine is received from a sensing means and then analyzed for discontinuities in the current profile, from which the presence of a fault can be deduced. In order to reduce the effects of the fault/sampling window adding energy to the system a control means is arranged to enable the sensing means only during a finite sampling window. Once a current discontinuity has been identified the detector can output a fault detect signal that may be a timing signal indicating the end of valve movement. If the detector is able to compare the discrete timing signal to known/expected valve operation then the detector may be able to determine unexpected valve operation. In such instances the detector may output an error signal that the vehicle's engine control unit (ECU) records or an error signal for display on the dashboard of the vehicle. If the detector is linked to or part of a valve control system then the output signal may be a control signal for adapting the firing characteristics of the injector.

Subsequent injection events, for which the position of the window position is moved, may be either (i) successive injection events or (ii) one of pilot, main or post injection events within successive injection cycles.

In one embodiment, the new sampling window position is determined as a median position of at least two of the preceding window positions, for which a fault detect signal is output. For example, the new sampling window position may be determined as a median position of three of the preceding window positions.

The processor is arranged to analyze the current through the actuator during the sampling window and to look for and identify discontinuities in the current flow. Such discontinuities can be linked to, for example, the valve reaching its stop and so the processor is effectively able to determine valve movements in dependence upon measured current discontinuities.

It is noted that the sensor may not directly sense the current through the actuator and may instead sense a parameter that is related to the current through the actuator. For example, the drive circuit may comprise a resistor in series with the actuator and the sensor may measure the voltage across the resistor.

In order to reduce processing requirements, the sensor may be arranged to sample the current parameter at a plurality of sample points during the sampling window.

Conveniently, the sensor may measure the current through a sensing resistor. Alternatively, the sensor may be arranged to sense the current through the actuator.

Conveniently, the sensor may comprise a sensing resistor and the data received at the inputs may be related to the current through the sensing resistor or the voltage across the sensing resistor.

The valve cycle may comprise a pull-in region during, a first voltage potential is applied across the actuator so that the valve is caused to move from a first state to a second state and a hold region, during which a second voltage potential or series of pulses at a second voltage potential is applied across the actuator.

Conveniently, in such a "pull-in"/"hold" arrangement, the controller may be arranged to enable the sensor between the pull-in and hold regions of the valve cycle. The controller may also be arranged to enable the sensor after the hold region of the valve cycle. It is noted that these two enablement positions correspond to the points within the valve cycle when the valves within the engine are expected to reach one of their two operating positions.

In order to allow the detection of faults, the controller may conveniently be arranged to output a control signal to one or more control switches in order to isolate the actuator from a power supply and to open a current path comprising the actuator and the sensor. It is noted that at the back end of the valve cycle, i.e. after the hold phase, the current through the actuator will fall towards zero. In order to detect the movement of the valve the control means may open a current path that is inactive during the pull-in and hold phases such that a current that includes the effects from the back EMF in the system flows through the sensor/drive circuit.

Conveniently, the controller may be arranged to progressively move the sampling window away from the end of the hold region in successive injection events.

Effective fault detection must include as small as possible a processing overhead for noise control. Using a method that relies solely on maxima detection in the current profile is ineffective since every sample will have a maximum that may or may not correspond to a valid fault. Using a threshold on the maxima is similarly ineffective since this does not allow for the range of possible valve/coil response patterns.

Therefore, in order to identify current discontinuities in the current profile, the detector (processor within the detector) may be arranged to analyze the received data by determining the second derivative of the current through the actuator with respect to time. Conveniently, the processor may be arranged to determine the presence of a current discontinuity if a maxima or minima is detected in the second derivative of the current through the actuator.

The second derivative may be determined based on a differential process, for which input data points are non-consecutive. This provides a processing advantage because a mathematical implementation based on a differential implementation is numerically one of the fastest operations that can be performed by a CPU.

The received data may be input to an analysis routine of the processor in the form of integer values having no units, thereby to minimize data handling and manipulation requirements.

Alternatively, the processor may be arranged to determine the presence of a current discontinuity if the second derivative of the current through the actuator exceeds a threshold value. This enables the detector to "filter out" transient effects within the current profile. For example, the second derivative of the current through the actuator should also exceed the threshold value for a set period of time in order for the detector to determine the presence of a current discontinuity. This also helps filter out transient spikes in the profile.

Conveniently, the processor may be arranged to determine the location of the current discontinuity by determining the third derivative of the current, I, with respect to time, the location of the discontinuity being equal to the time when $d^3I/dt^3=0$.

According to a second aspect of the present invention, there is provided a method of detecting valve movement of a valve in a fuel injector of an engine system, the valve comprising an electromagnetic actuator that is arranged to move the valve between first and second positions during a valve cycle, the method comprising sampling the current through the actuator during a finite sampling window, analyzing the sampled current for current discontinuities, and determining valve movements in dependence upon the current discontinuities. The method further comprises moving the sampling window from a first window position for a first injection event to a progressively later window position for one or more subsequent injection events, calculating a new sampling window position on the basis of a valve movement signal (e.g. fault detect signal) output for at least two of the preceding window positions, and feeding back the new sampling window position for a subsequent injection event.

According to a third aspect of the present invention, there is provided a fault detector for detecting valve movement of a valve in a fuel injector of an engine system, the valve comprising an electromagnetic actuator that is arranged to move the valve between first and second positions during a valve cycle, the detector comprising: inputs for receiving data related to the current through the actuator; a processor arranged to analyze the received data for current discontinuities and outputs for outputting a valve movement signal (e.g. a fault detect signal) in dependence upon the current discontinuities determined by the processor. The processor is arranged to analyze the received data by determining the second derivative with respect to time of the current through the actuator. The processor may be further arranged to determine the second derivative based on a differential process, for which input data points are non-consecutive.

According to a fourth aspect of the present invention, there is provided a method of detecting valve movement of a valve in a fuel injector of an engine system, the valve comprising an electromagnetic actuator that is arranged to move the valve between first and second positions during a valve cycle, the method comprising: sampling the current through the actuator in order to determine current data; analyzing the sampled current data for current discontinuities and outputting a valve movement signal in dependence upon the current discontinuities. The current data is analyzed by determining the second derivative with respect to time of the current through the actuator. The second derivative may determined based on a differential process wherein input data points are non-consecutive.

The present invention extends to a computer program on a computer readable memory or storage device for execution by a computer, the computer program comprising a computer program software portion that, when executed, is operable to implement a method of the second or fourth aspects of the invention. The invention also extends to an engine control unit for a vehicle comprising a detector according to the first or third aspects of the invention.

This process of differentiation provides a substantially more efficient method than the prior art, in terms of processing and memory resources.

The method may be further improved by using non-unit delimited input data in the differential process.

It is noted that optional features of the first aspect of the present invention may apply to the second, third and fourth aspects of the invention also.

Another aspect of the invention provides a fault detector for detecting valve movement of a valve in a fuel injector of an engine system, the valve comprising an electromagnetic actuator that is arranged to move the valve between first and second positions during an engine operating cycle, the engine system comprising sensing means for sensing a current through the actuator, the detector comprising: control means arranged to control the sensing means; inputs for receiving from the sensing means data related to the current through the actuator; a processor arranged to analyze the received data for current discontinuities and outputs for outputting a valve movement signal in dependence upon the current discontinuities determined by the processor wherein the control means is arranged to enable the sensing means during a finite sampling window and is arranged to move the sampling window from a first position in the engine operating cycle to a second position in the engine operating cycle.

BRIEF DESCRIPTION OF THE DRAWINGS

In order that the invention may be more readily understood, reference will now be made, by way of example, to the accompanying drawings, in which:

FIG. 1 is a sketch comparing fault and non-fault current waveforms;

FIG. 3*a* shows a typical current profile through an actuator during a single combustion cycle;

FIG. 3*b* shows the valve movement of the actuator corresponding to the current profile of FIG. 3*a;*

FIG. 3*c* shows a sampling window between the pull-in and hold phases of a current profile;

DETAILED DESCRIPTION

FIG. 1 is a simple representative sketch showing a voltage waveform V that is applied across an actuator and two current profiles $I_1$ and $I_2$. The first current profile $I_1$ shows the current that flows through the actuator coils as a result of back EMF when there are no sudden changes in the motion of the valve. It can be seen that the current profile is smooth.

By contrast, in the second current profile $I_2$ there is a discontinuity. This corresponds to a sudden change in the motion of the valve, e.g. when it reaches its stop. The present invention is concerned with the identification of these types of fault in the current through the actuator and with the minimization of the problems associated with known fault detection methods.

Figure 2:
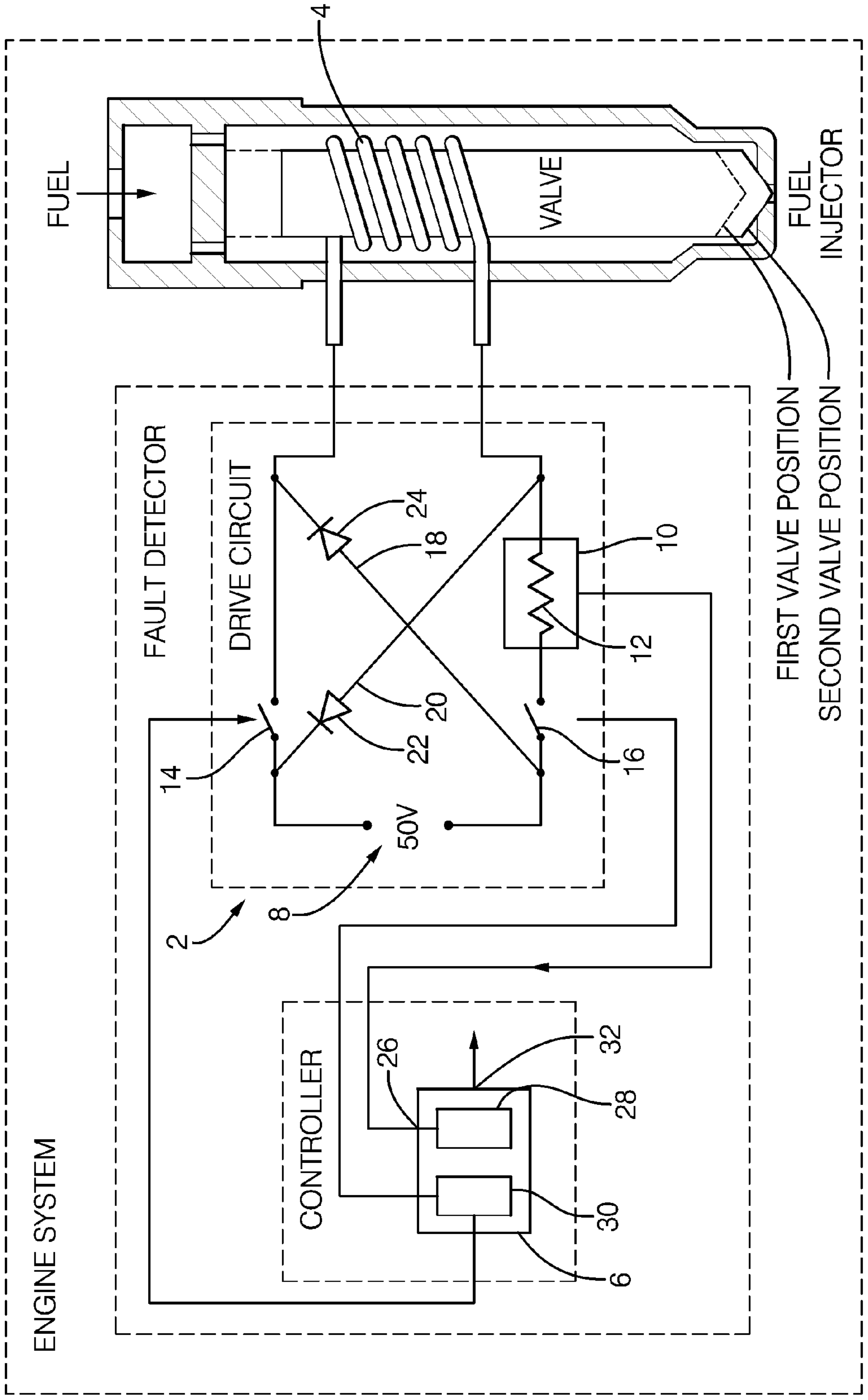
FIG. 2 is a simple circuit schematic of a drive circuit for an electromagnetically controlled valve actuator.

FIG. 2 is a representation of a simple drive circuit 2 for a coil-based actuator 4, i.e. an electromagnetically controlled coil and a fault detector 6 in accordance with an embodiment of the present invention.

The circuit comprises a power supply 8 (in this case 50V), a solenoid actuator 4 and a sensing means 10 that comprises a sensing resistor 12. Two controllable switches (switch 14 and switch 16) connect the power supply 8 to the sensing resistor 12 and actuator 4. Cross circuit connections 18, 20 are provided, each comprising a diode 22, 24 to restrict the direction of allowable current flow.

The fault detector 6 comprises inputs 26 for receiving data related to the current through the actuator 4, processing means 28, control means 30 for controlling switches 14 and 16 and output means 32 for outputting a valve movement signal.

The voltage across the sensing resistor can be measured and therefore the current through the solenoid determined. The power supply and controllable switches 14 and 16 may be controlled by, for example, an engine control unit (ECU) (not shown in FIG. 2).

A typical current profile 40 representing the current through the actuator 4 during a single combustion cycle is shown in FIG. 3*a*. FIG. 3*b* shows the corresponding valve movement 42 as the current varies.

The operation of the valve and drive circuit will now be described with reference to FIGS. 2 and 3.

In order to initiate injection, both switches, 14 and 16, are closed. The current through the actuator 4 then rises from zero up to a maximum peak value 44. This phase of the injection cycle is referred to as the "pull-in" phase (or alternatively as the "front end").

Once the current has reached its maximum value, switch 14 is opened and the current begins to decay naturally. During this current decay the valve moves such that injection commences. As the current falls to a certain level, switch 14 is repeatedly opened and closed (or "chopped") in order to maintain injection through the activated valve. This chopping is shown by a number of smaller peak values 46, 48, 50 in the current profile. This phase of the injection cycle is known as the "hold" phase.

To terminate injection both switches 14 and 16 are opened and the current falls to zero. After a short time lag and as the current falls, the valve moves to its un-activated state.

In order to detect when the valve reaches its stop, switch 16 may be re-opened such that a current path is formed. Due to the effects of the valve moving through the magnetic field created by the actuator coil, a back EMF is set up that either re-enforces the current or partially cancels the current (depending on the direction of motion of the valve). This period of EMF-related current and normal current superposition is shown in FIG. 3*a* (between 52 and 54). FIG. 3*b* shows the corresponding valve lift during the current events. When the valve reaches its stop there will be a discontinuity or fault 56 in the current profile that corresponds to feature 58 in FIGS. 3*a*/3*b*. (It is noted that the valve depicted in FIG. 3*b* undergoes a "bounce" event 59. This type of event can occur in cases of rapid valve timing changes where the valve may effectively bounce).

This "fault detection" phase of FIGS. 3*a* and 3*b* is also known as the "back end" of the combustion cycle/engine operating cycle of the engine.

It is also noted that there will be a further "fault" 60 that is produced as the valve first reaches its activated state (i.e. between the pull-in and hold phases).

In any given combustion cycle there will be two faults 58, 60. To reduce processor loading the current profile is usually sampled within a defined period, herein termed as the "sampling window". FIG. 3*a* has been marked to show the location of two sampling windows 62, 64 around the expected positions of the two faults.

It is also noted that to reduce processor loading further the current through the actuator would normally be sampled at a number of defined sample points rather than continuously through the sampling window. This is illustrated in FIG. 3*c* wherein the sampling window 62 between the pull-in and hold phases is shown in more detail, and individual sampling points 66 are highlighted.

Figure 4:
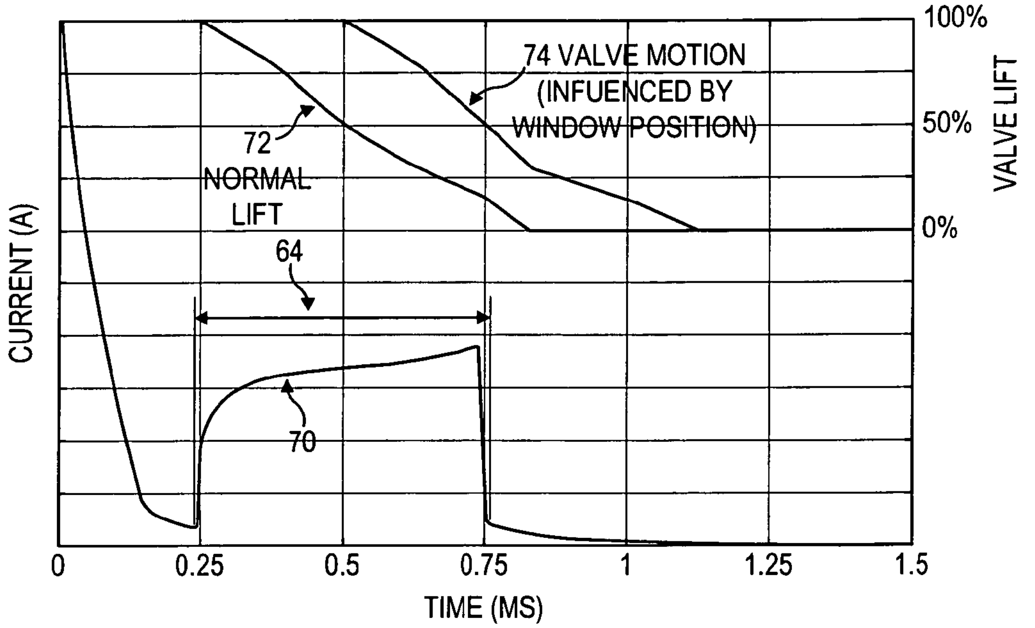
FIG. 4 is a graph showing current/valve movement with time along with a sampling window.

FIG. 4 shows the effect the fault window may potentially have on the movement of the valve. It is noted that FIG. 4 shows a sample window 80 that is too early relative to the movement of the valve.

The current profile at the end of the hold phase is shown in more detail in FIG. 4. A sampling window is also shown, during which a current that includes the effects from the back EMF in the system flows through the drive circuit. The current profile 70 during the sampling window has a characteristic shape.

The movement of the valve as the current varies is also shown in the Figure. A first valve lift line 72 is shown that indicates that the valve should reach its stop position shortly after the end of the sampling window. A second valve movement trace 74 depicting the actual valve movement is also shown. This second trace 74 illustrates the effects of the current in reenergizing the drive circuit of the valve. It can be seen that the sampling window has the effect of delaying the valve.

To reliably detect a fault in such circumstances is difficult. A prior art solution is to extend the duration of the sampling window (i.e. in this "back end" example of FIG. 4 this would be activated by keeping switch 2 closed for longer). This solution however would have the effect of delaying the valve movement even further since keeping switch 2 open for longer means that the current input and hence magnetic field strength affecting the valve would be greater, retarding its natural motion.

Figure 5:
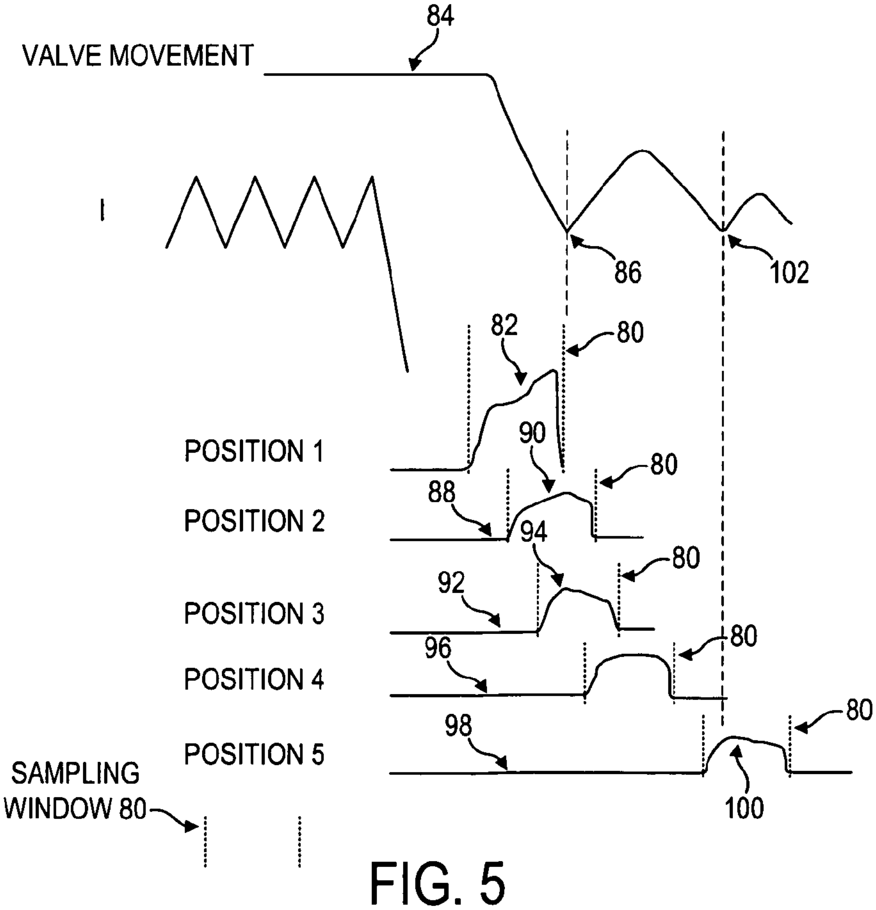
FIG. 5 shows a sampling window in various positions relative to the end of the hold phase.

A sampling window and method of fault detection in accordance with a first embodiment of the present invention is shown in FIG. 5. In this embodiment of the invention the sampling window is not fixed at a certain point in the combustion cycle of the engine but is instead capable of being swept in time between different cycles.

In FIG. 5, five different sampling window locations are depicted relating to a specific injection event (e.g. pre-injection, main injection or post injection) within subsequent injection cycles. It is also noted that the five sampling window locations are arranged to be progressively moved away from the end of the hold region in successive injection cycles. This is done in order to ensure that the first fault is detected and to mitigate against the possibility of a secondary fault (caused by valve bounce as described) above being misclassified as the primary fault.

The window 80 starts in an initial position (Position 1) that may be a fixed period of time after the end of the hold period. In this position the current profile 82 resembles the profile of FIG. 4, wherein the current slowly builds to a maximum at the end of the sampling window before falling away to zero. From the valve movement trace 84 shown in FIG. 5 it can be seen that the sampling window's initial position is too early and has missed the "fault point" 86 (i.e. the valve stop).

In the next injection cycle the sampling window 80 has been advanced to a later time (Position 2). The profile 88 has now changed and the maximum 90 in the current profile is now seen to be located part way through the sampling window 80 (as opposed to at the end of the sampling window as in the first position). It is clear that the sampling window has "found" the fault 86.

In Position 3, for the next injection cycle, the sampling window 80 has been moved even further forward in time. The current profile 92 is similar to that of Position 2 but the current discontinuity 94 now appears in a slightly earlier part of the current profile.

In Positions 4 and 5, for subsequent injection cycles, the sampling window 80 has been moved past the first fault 86. The current profile 96 in Position 4 shows no evidence of a current discontinuity but the current profile 98 in Position 5 shows a further discontinuity 100 that represents a secondary valve stop event 102 (it is noted that in cases of rapid valve timing changes the valve may effectively bounce and so there will be a secondary fault).

A few observations relating to the above discussion of the first embodiment of the invention are noted. Firstly, in Positions 2 and 3 it is noted that the position of the fault 86 is actually a constant time after the end of the hold period. It is only the sampling window 80 (and therefore current profile 88, 92) that has moved to a later time between Positions 2 and 3. Secondly, any prior art method of fault detection that relies on jumping to a last known location of the fault runs the risk that the secondary bounce event is detected and not the main event. The method according to the first embodiment of the present invention avoids any such issues and in fact has the advantage that both faults may be detected.

The fault that is detected corresponds to a discrete timing point (i.e. the sharp/discontinuous end of valve movement). Therefore, once the fault has been detected, the detector may output a valve movement signal to, for example, the vehicle's ECU that comprises this discrete timing point.

FIG. 5 describes the use of an adaptive sampling window 80 at the back end of the injection cycle. It is however noted that the same principle may be applied to a sampling window at the front end of the injection cycle. An example of such a sampling window is depicted in FIG. 3*c* and is discussed in more detail below. It is noted that in this case the sampling window 80/sample points 66 may be moved in time until the front end fault is detected.

Further advantages of the adaptive sampling window according to the present embodiment of the invention are as follows:

- An adaptive window sweep allows detection of the fault when the individual valve characteristics are unknown. This means that the individual valve timings required for accurate and precise adjustment of waveforms can be found while the injector is running, instead of relying on factory testing. It also means that rapid valve timing changes (for example if the valve seat is damaged by debris) can be picked up and compensated for.
- The effect of energy input to the system can be minimized by moving the sampling/fault window as far as possible from sensitive areas. For example, if the sampling window is too close to the end of the hold region, the valve may not open and the valve actuation period may be extended. Similarly, if the sampling window is too far from the end of the hold region, there is a risk of unwanted detection of secondary bounces or other artifacts.

As the window moves past the fault, less energy will be returned to the magnetic flux and hence there will be a smaller imposed error due to window position.

A moving sampling window means that the fault can be searched for by a series of steps from the sampling window initial position (Position 1) to the sampling window end position (Position 5). Typically the start position is offset from the end of the hold region.

The moving sampling window allows for detection of the fault under transient conditions without changing the major search parameters.

The sampling window position is adapted to the different positions required for detection due to changed engine running conditions (e.g. speed/load changes). FIG. 5 gives an example of a back end sampling window sampled from a typical running condition. The minimum and maximum window positions are also adapted according to the current running conditions. This means that the effective search area can be maximized for each condition as well as avoid any problem areas.

Where the fault position can be estimated (or is known) from a previous detection at a given condition, the adaptive window is able to jump directly to this location and begin fine tuning the position as below.

After finding a fault, the adaptive window is able to centre itself on the fault position and fine tune the detection by small movements around the known fault point. This allows for higher precision as the fault value can then be an amalgam of several real time values.

As described in relation to a further embodiment of the invention below, a suitable processing algorithm may be used to identify the presence of a fault. Advantageously, by moving the sampling window 80 at the front end of the injection cycle allows the same algorithm to be used for both types of detection since ultimately the algorithm will only see a limited number of samples. This improves both the memory usage and data handling requirements. The following further benefits are also noted with respect to a front end sampling window:

The fact that a moving sampling window is used means that a reduced number of samples are required so as to reduce CPU and memory load for the sampling algorithm at both the front end and the back end.

Using adaptive front end sampling means that there is better response to transient or rapidly changing engine conditions.

Adaptive front end sampling also reduces the possibility of noise or spikes triggering a false detection since at any time only a fraction of the total current profile is being examined.

The adaptive front end sampling window moves the region of sampled points in the current data away from the point of peak current in the same manner that the fault window is moved away from its minimum position. The delay between the peak current in the pull-in phase and the start of sampled region is increased in an analogous way to moving the window position for the back end. A key difference is that the start of the chop region is linked to the end of the sampling window by a set delay. This means that the start of the chop region relative to the sampling window is fixed but moves away from the peak position at the same time the sampling window is moved up until the maximum sampling position is reached. Thus if a fault is detected, the start of the chop region will occur at a set time after the fault in order to minimize the energy loss of the coil by reducing the time when the magnetic field is in the free decay state.

Figure 6:
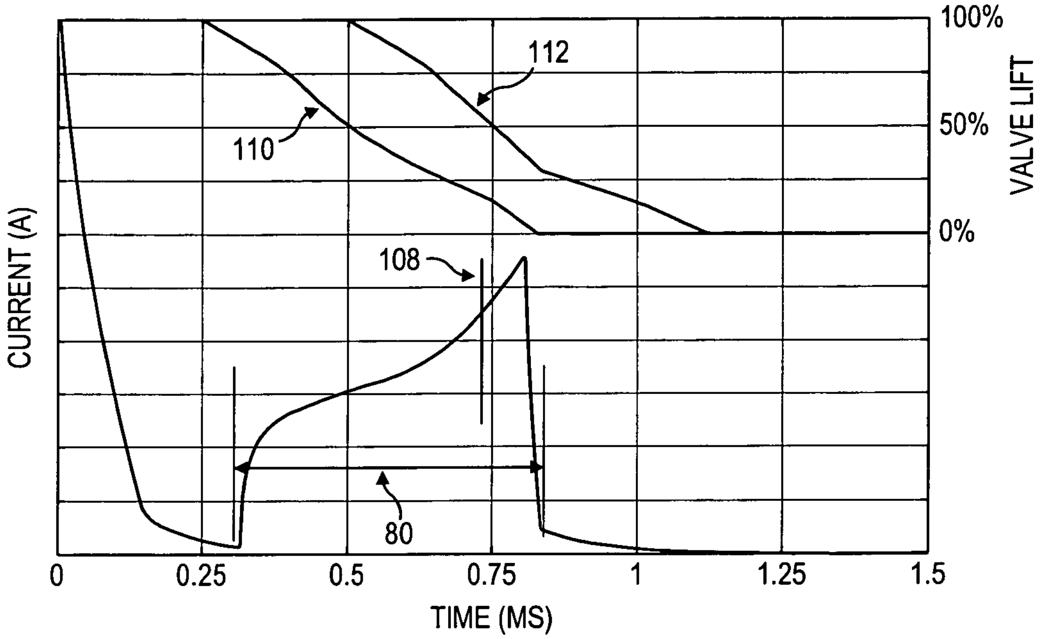
FIGS. 6 to 8 are further graphs similar to FIG. 4 depicting the sampling window in progressively later positions.
Figure 7:
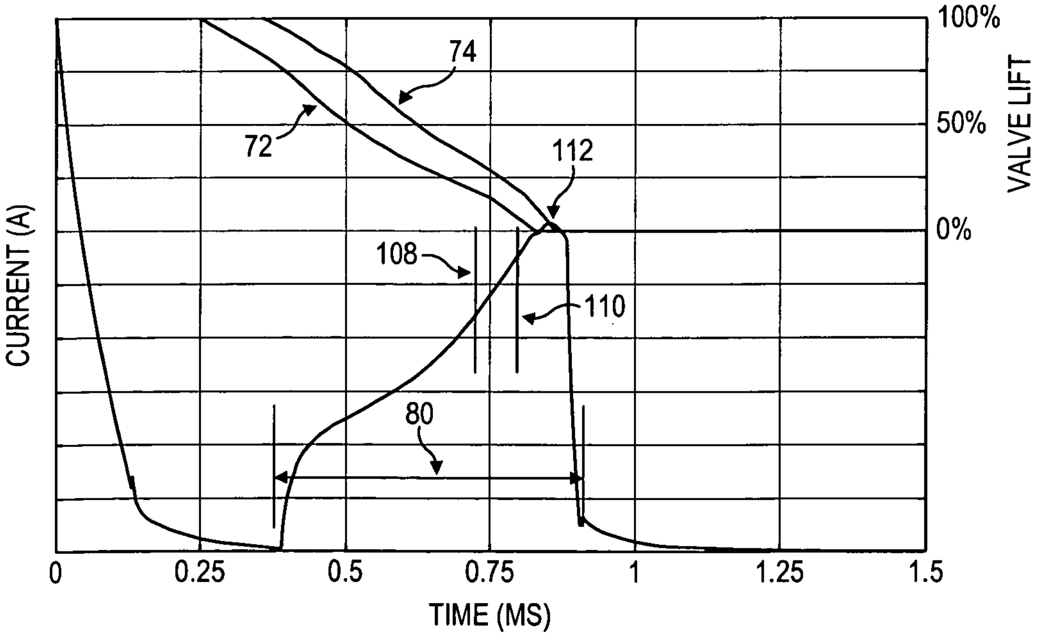
Figure 8:
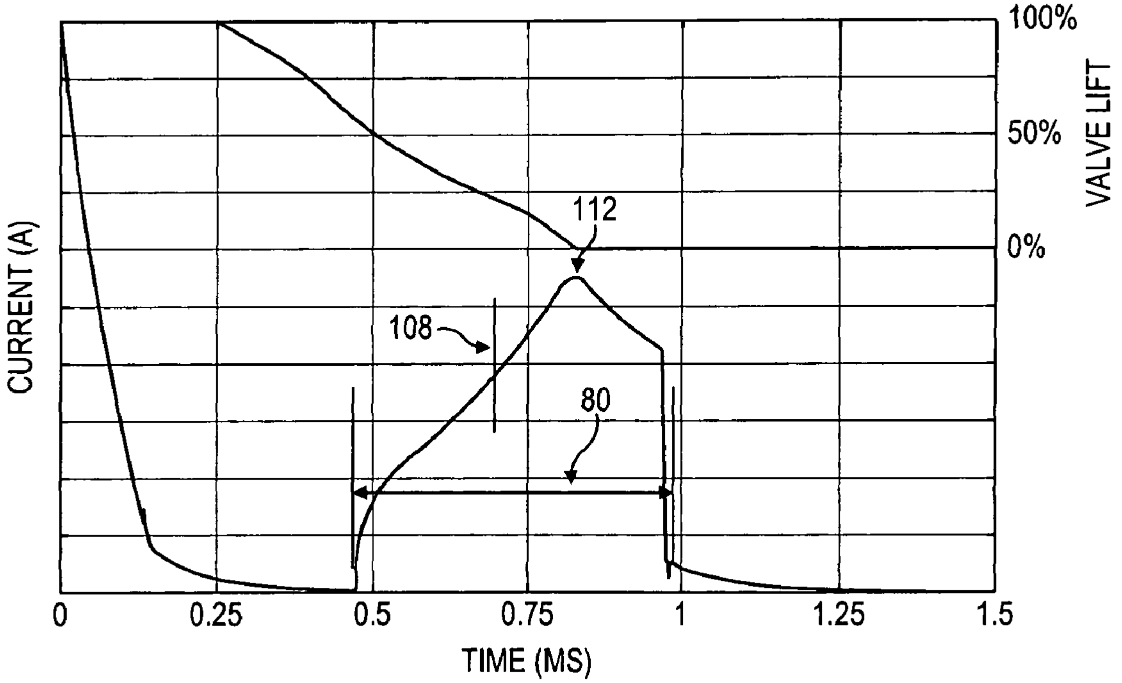

FIGS. 6 to 8 show further, more detailed examples of an adaptive sampling window 80 in accordance with the first embodiment of the present invention and are considered in conjunction with FIG. 4 described above.

FIG. 4 represents the initial position of the adaptive sampling window. As shown in FIG. 4 the window extends from approximately 0.25 milliseconds from the end of the hold phase to 0.75 milliseconds after the end of the hold phase.

In FIG. 6 the start of the sampling window 80 has moved to approximately 0.3 milliseconds after the end of the hold phase. The end of the sampling window is now located at approximately 0.8 milliseconds. For comparison the location 108 of the maximum current from FIG. 4 is marked on FIG. 6 and it can clearly be seen that the maximum position has moved relative to FIG. 4.

Valve movement (both normal motion 72 and window affected valve motion 74) is again marked on FIG. 6 and it can be seen that the window 80 ends just as the valve would (if the sampling window were not affecting valve motion) be approaching its stop position. However, because of the re-energizing effect of the window drive circuit the valve movement is again delayed.

In FIG. 7 the sampling window 80 has again moved position and it now extends from approximately 0.4 milliseconds to 0.9 milliseconds after the end of the hold phase.

In this Figure it can be seen that both of the valve movement traces reach zero within the confines of the sampling window thereby indicating that the sampling window is now overlapping the stop position of the valve. The current maximum positions 108, 110 from FIGS. 4 and 6 are marked on FIG. 7.

The current profile now shows a discontinuity (fault) 112 at around 0.8 milliseconds after the end of the hold phase.

In FIG. 8 the current maximum 114 is now clearly located within the window. For comparison the maximum from FIG. 4 is indicated on the current profile.

The above description of the first embodiment of the invention relates to "sweeping" the fault window for successive injections within an engine operating cycle (e.g. speed/load condition). In practice, and as shown in FIG. 9, an injection cycle may include more than one injection event, in which case a fault window "sweep" takes place for each of the like-injection events over consecutive injection cycles.

Figure 9:
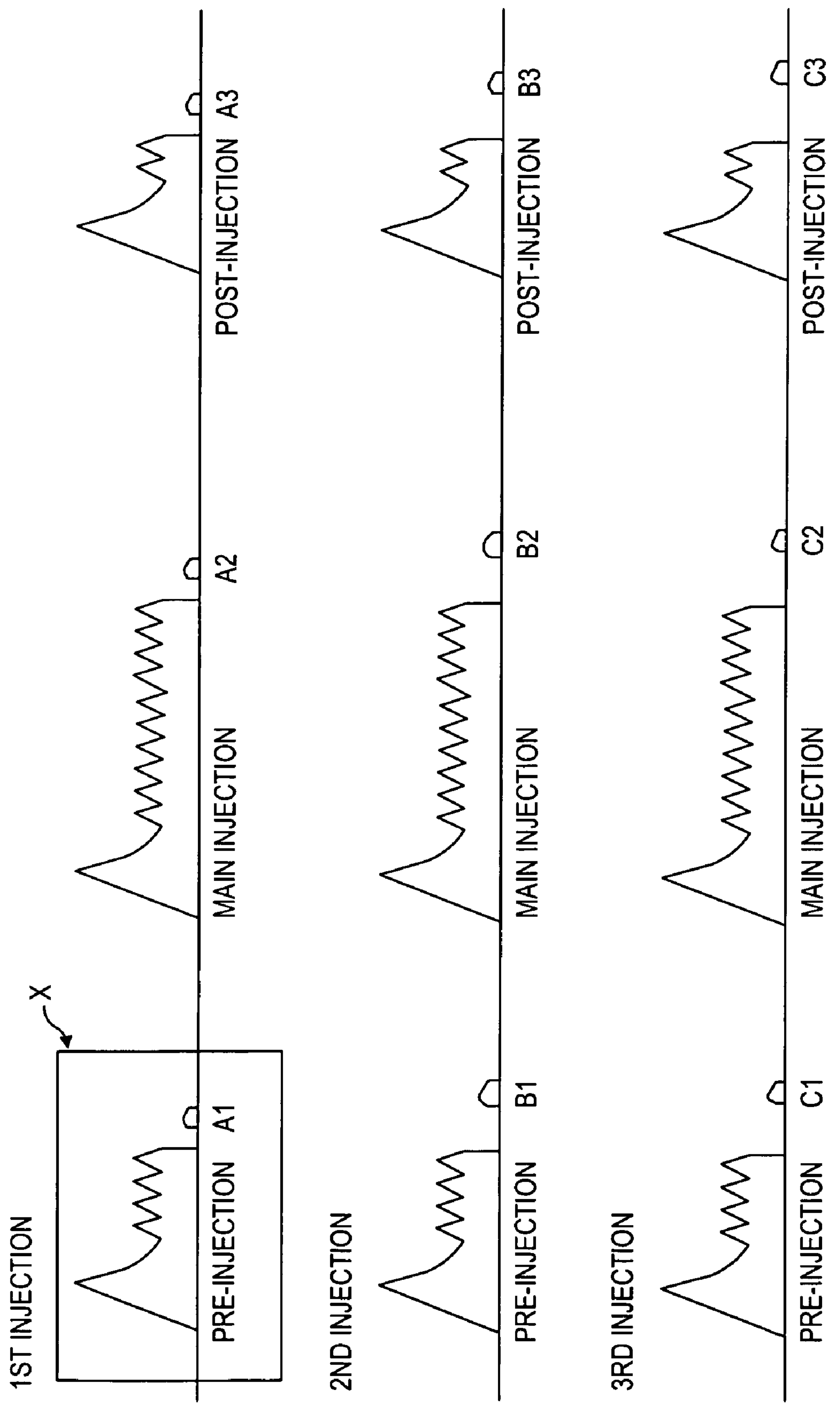
FIG. 9 shows three injection cycles, each comprising a pilot (pre), main and post injection event, to illustrate how the method of the invention is applied to injection cycles comprising more than one injection event.

Referring to FIG. 9, an example injection cycle includes a pilot injection (or pre-injection), a main injection and a post injection. The current profile for three injection cycles is shown, together with the position of the moving fault window for each event. For injection cycle 1, the pre-injection has a fault window position A1, the main injection has a fault window position A2 and the post injection has a fault window position A3. Likewise, for injection cycle 2 the pre-injection has a fault window position B1, the main injection has a fault window position B2 and the post injection has a fault window position B3 and for injection cycle 3 the pre-injection has a fault window position C1, the main injection has a fault window position C2 and the post injection has a fault window position C3. A single valve cycle (i.e. where the valve moves from an initial position to an activated position and then returns to its initial position), corresponding to the pre-injection event of injection cycle 1, is indicated by the box X.

Figure 10:
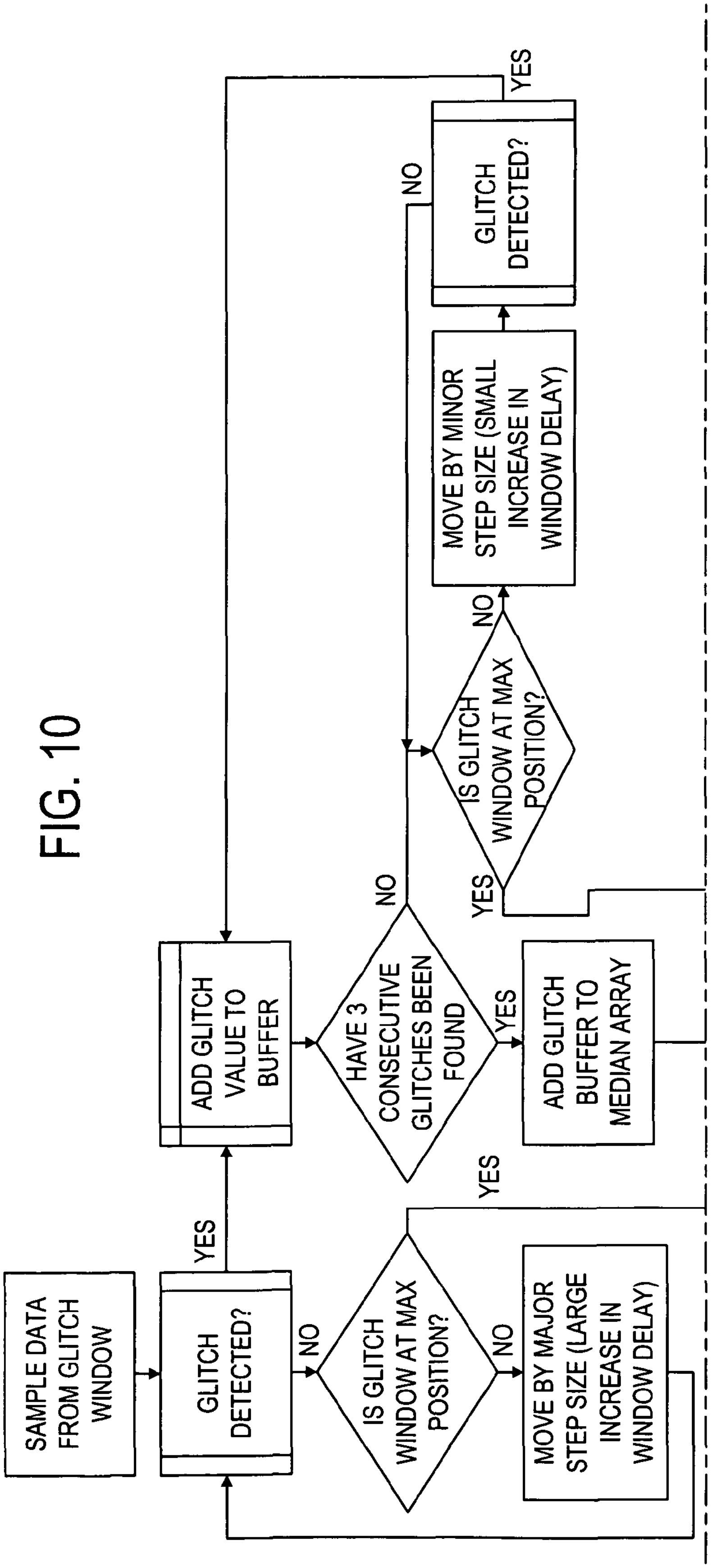
FIG. 10 is a flow diagram to illustrate the method steps of an embodiment of the invention.

FIG. 10 illustrates a flow diagram of the fault window sweep algorithm that is carried out for each injection event type of an injection cycle. The routine includes the following steps:

An initial window position A1 is set for the pre-injection and, if a fault is detected, the fault position is input to a data buffer.

For the next pre-injection event, the window position is moved through a window step to position B1 (as shown in FIG. 9) and, if a fault is detected, that position is stored in the data buffer. When three consecutive fault detection events have been detected, this is taken as an indication that a genuine valve stop event has been detected and these three fault detection times are transferred to the first three elements of a median data array.

This sequence of events continues for the pre-injection events of consecutive injection cycles (third, fourth, fifth injection cycles . . . ), incrementing the window position by the window step for each cycle. The sequence of events is continued until such time as the fault window has moved to a maximum window position or until the median array has become full. If the maximum window position has been reached, this signifies that the sweep has completed but without the required number of consecutive faults having been detected (referred to as "a result"). When the median array becomes full, a valid fault timing point is determined as the median of the values in the median array.

Where the sweep of window position completes without a result, the value of the maximum window position can be set in software to any convenient value, although for speed of operation (iterations of the sweep process) it is best to keep this value to the minimum required.

Where a valid fault window position is determined from the median of the values in the median array, this window position may then be used to adjust the main waveform parameters. Thus, a given valve may perform at any opening speed and the main control waveform for the valve may be adjusted such that the corresponding physical event occurs at the required time. Since changing the main control waveform constitutes a change in operating conditions, the sweep process may also need to be re-iterated. In practice it may be useful to have programmatic damping on the number and size of adjustments to the main waveform to avoid unnecessary iteration of the sweep process.

With the window in this optimum position for subsequent injection events the impact of the window position on the fault time is minimized and the accuracy of any further fault times are maximized. If the fault stops being detected at this centered position (for example if engine operating conditions change), the sweep process is restarted. The centered window position value may be stored in memory and used as the starting point for any subsequent sweep iterations to speed up the detection process. In this way the fault window position is adapted based on preceding fault detection events, the key feature being that feedback from the fault detection process is needed to determine the next window position.

The same method steps are also followed for the main- and post-injection events of the injection cycles, with the fault positions for each being stored in a designated data buffer for that particular injection event type. A median value of fault position is determined once the median array is full and this value is used for subsequent injection events of that type.

In practice it may be preferable to use more than three fault detection events to determine the median value. For example, the detection of three consecutive fault detection events may be taken as an indication that a genuine valve stop event has been detected, but subsequent fault detection events may be added to the median data buffer before the median value calculation is carried out.

Figure 11:
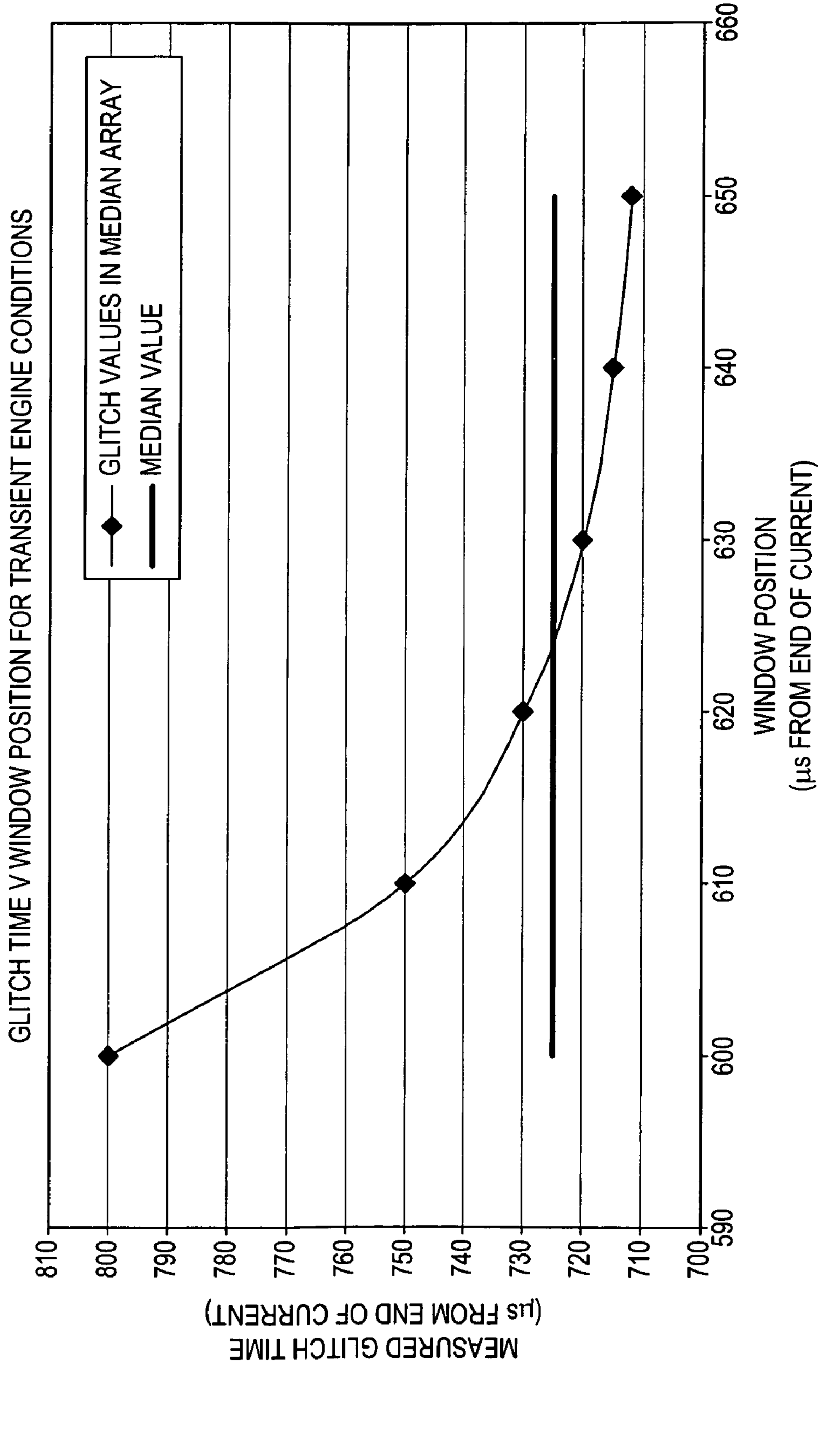
FIG. 11 is a graph to illustrate the negative effects of fault window position on fault detect time for steady state engine conditions.
Figure 12:
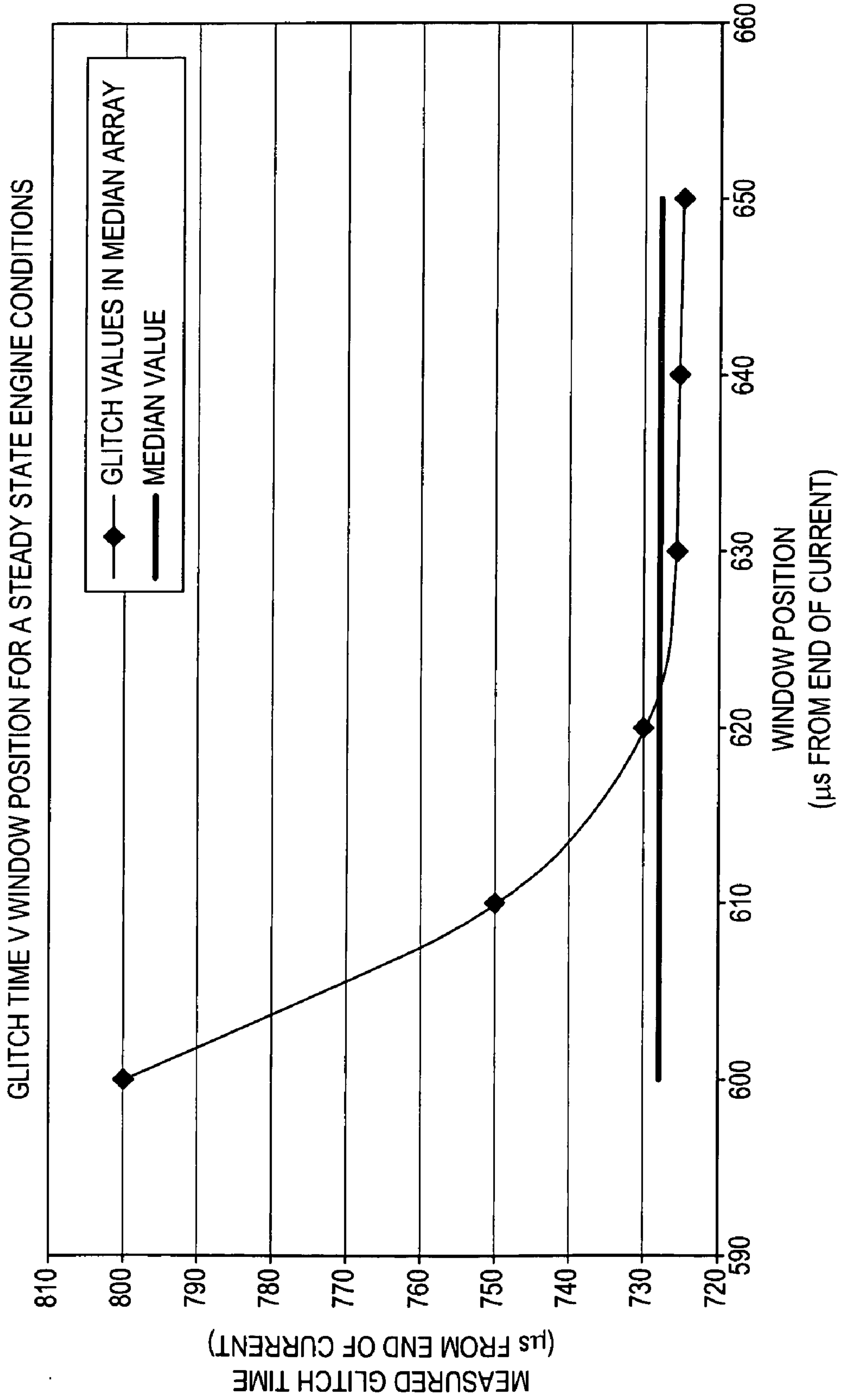
FIG. 12 is a graph to illustrate the negative effects of fault window position on fault detect time for transient engine conditions.

It can be seen from FIG. 11 and FIG. 12 that the greatest influence of window position on detected fault time occurs for the first few detections, so it is beneficial to add as many further detection events as possible to the median array. In this way the median value determined will have the least bias due to early window positions. A drawback to having a large median array size is the potential to sweep past the fault position before filling the median array. In this way the choice of median array size becomes a compromise between accuracy and robustness for any given application. For example, it may be preferable for the median value to be determined from three consecutive faults and a further three faults (not necessarily consecutive) within the sweep (i.e. before the maximum window position is reached). By way of example, FIGS. 11 and 12 show the result of the median fault position calculation for a series of six faults for transient and steady state engine operating conditions, respectively. By continually adapting the fault window position based on several preceding fault detection events (e.g. by calculating the median value), a more accurate selection of fault window position is selected that has the least impact the fault detect measurement. This feature is particularly useful for dealing with a wide range of operating conditions (both static and transient) that need not be known beforehand, as well as coping with a variety of valve configurations including pressure driven valves operating at high speeds (i.e. valves for which the basic timing parameters are affected by operating conditions).

The first embodiment of the present invention relates to an adaptive window that may be used to detect faults in the operation of an electromagnetically controlled valve.

In the second embodiment of the present invention an analysis technique for determining the presence of a discontinuity in the sampled current profile is disclosed.

It can be seen from FIGS. 4, 6-8 that the position of the maximum in the current profile moves with the sampling window 80 until a fault 112 is uncovered, at which point the current maximum remains fixed.

One method of analysis for determining the location of a fault is to record and plot the position (in time) of the current maximum. The location of a fault is determined by looking for "bunching" in the position of the current maximum, for example as the window is moved between successive positions (in different engine operating cycles) the temporal location of the current maximum is expected to change by a known amount. As the fault is approached the maximum will move relatively less (compared to readings taken before the sampling window reached the fault point) and so the measured current maximum positions will get closer to one another. The presence of the fault can then be inferred.

The above analysis technique is potentially susceptible to mis-detection of the fault due to noise and other anomalies in the measured current profile. The signal processing required to implement the above technique may also place significant processing loading on the processor used to manipulate the sampled data.

The second embodiment of the present invention therefore provides an analysis implementation that reduces calculation overhead and reduces the need for signal processing.

The second embodiment of the present invention takes the sampled raw current data and determines the first and second derivatives of the current values with respect to time. The reason behind going to the second differential is that looking for a maximum by examination of the raw data alone leads to mis-detection, as every sample will have a maximum and using a threshold, above which the maximum is defined, implies that samples close to the fault points would still falsely trigger. The second differential method ensures that the sample has passed through a genuine maximum.

In one aspect of this embodiment of the present invention the third differential of the current values may be determined and analyzed to determine where the third differential crosses zero. This further differential is used to avoid false detection caused by brief spikes or noise over the threshold limits.

The method of using differentials in the detection routine gives a good detection response over a range of possible valve current signatures. Using differentials of the form outlined below also has the advantage of adding some filtering to the raw data and in this way increases the tolerance of the algorithm to sources of outside electrical noise as would be expected in the application environment. This method of differential implementation also has the benefit of faster calculation because it is based on the mathematical difference between values, which is numerically one of the fastest operations that can be performed by a CPU. This reduces the calculation overhead and eliminates the need for further signal processing.

Figure 13:
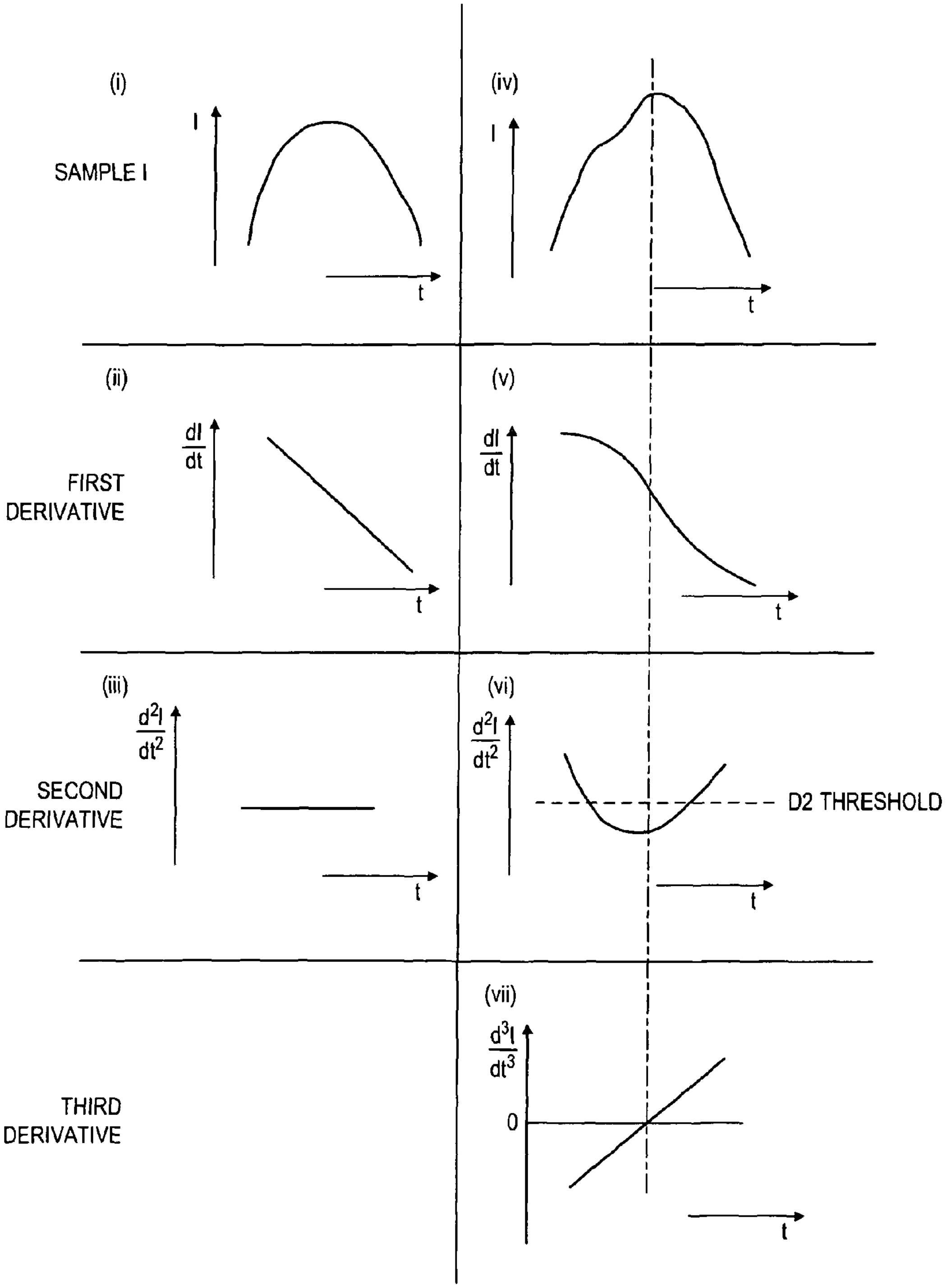
FIG. 13 shows various current and current derivative graphs for a case where there is a fault and a case where there is no fault.

The second embodiment of the present invention will be described in detail with reference to FIGS. 14 to 20. In FIG. 13, however, a comparison of the analysis technique according to the second embodiment of the present invention is illustrated with respect to (i)-(iii) an idealized current profile (no fault) and (iv)-(vii) an idealized current profile exhibiting a fault.

The left hand side of FIG. 13 shows (from top to bottom): graph (i)—the sampled current data for the current profile without a fault; graph (ii)—the first derivative of the current profile; graph—(iii) the second derivative of the current profile.

The right hand side of FIG. 13 shows (from top to bottom): graph (iv)—the sampled current data for the current profile with a fault; graph (v)—the first derivative of the current profile; graph (vi)—the second derivative of the current profile; graph (vii)—the third derivative of the current profile.

In graph (i) it can be seen that the current profile is a smooth curve. The derivative of this current profile is shown in graph (ii) and is seen to be a straight line of negative gradient. The second derivative of the current profile is therefore a straight line.

By contrast, it can be seen that the current profile in graph (iv) has a discontinuity at the marked location. The first derivative of the current profile is shown in graph (v) and due to the discontinuity it is noted that the first derivative is not a straight line as was the case in graph (ii).

In graph (vi) the second derivative of the current profile has been taken for the fault current profile and it can be seen that there is a minimum in the trace (and the minimum is centred on the position of the fault). The presence of the fault can therefore be conveniently be determined by calculating the second derivative and analyzing the second derivative for regions that exceed a threshold value. It is noted that the position of the minimum (or maximum in the case of a fault analysis performed on the front end of the injection cycle) equates to the location of the fault.

The third derivative of the current profile may be determined to confirm the location of the fault (see graph (vii)), the fault being located at the zero crossing point of the third derivative.

The rules and criteria for successful detection according to the second embodiment of the present invention are designed to be simple and robust on the basis of the values of the differential arrays. The second differential must be greater than a given threshold (the d2 threshold) and the third differential (d3) must cross zero in the same range of points that are above the d2 threshold. There is an added feature that there must be a minimum number of points to be a valid range for detection of the d3 zero crossing to avoid false triggering due to spikes/noise.

Using the d3 zero crossing method means that even in areas of high d2 values (i.e. over the d2 threshold) only actual maxima will be detected. This benefit of the d3 system means that the broadest possible range of values is tested for possible fault characteristics. It also means that relatively low values of d2 threshold can be used so as to ensure the largest range of different valve responses can be analyzed at the same settings (i.e. it maximizes the variation that can be handled between units).

Using the above method of detection also has the benefit of being able to discriminate between different valve motion events. Since the window moves linearly and the d2 threshold can be changed easily, the control of these parameters allows detection of first bounce (the initial impact of the valve upon its stop), second bounce (after the first bounce, the valve motion returns to its original course and again impacts the stop but with reduced force and speed) and other bounce events. The ability to detect the various bounce events has benefits for development and analysis in the motion of the valve can be studied in a more detailed way. A second major benefit to being able to collect bounce data is using this as an alternative to first bounce fault for timing control purposes. For example if the valve hitting its stop is rapid enough then there can be insufficient time for the corresponding fluid event to occur (such as pressurization due to restricted flow around the valve seat).

In this instance, the second bounce may be a better predictor for the physical event as the valve is moving slower as it approaches its stop.

The method of differential calculation is described below in conjunction with FIGS. 14 to 20.

Figure 14:
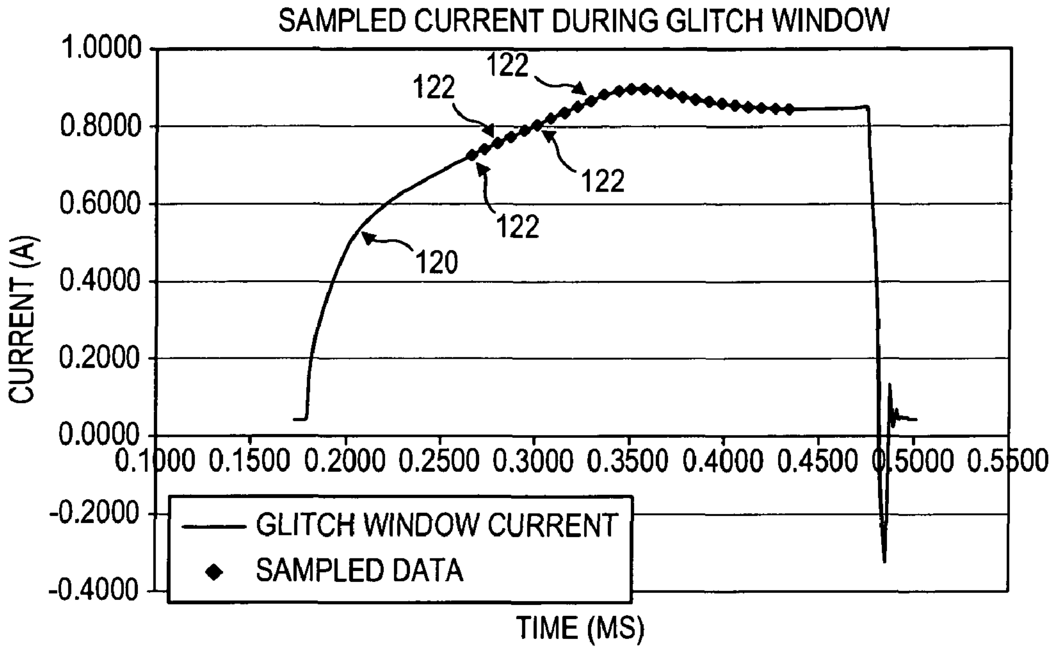
FIGS. 14 to 20 show various current and current derivative traces with respect to time.

In FIG. 14, a current profile 120 is shown. During the sampling window the current is sampled m times at equal time intervals, x (in this example m=25), as indicated by sample points 122.

Figure 15:
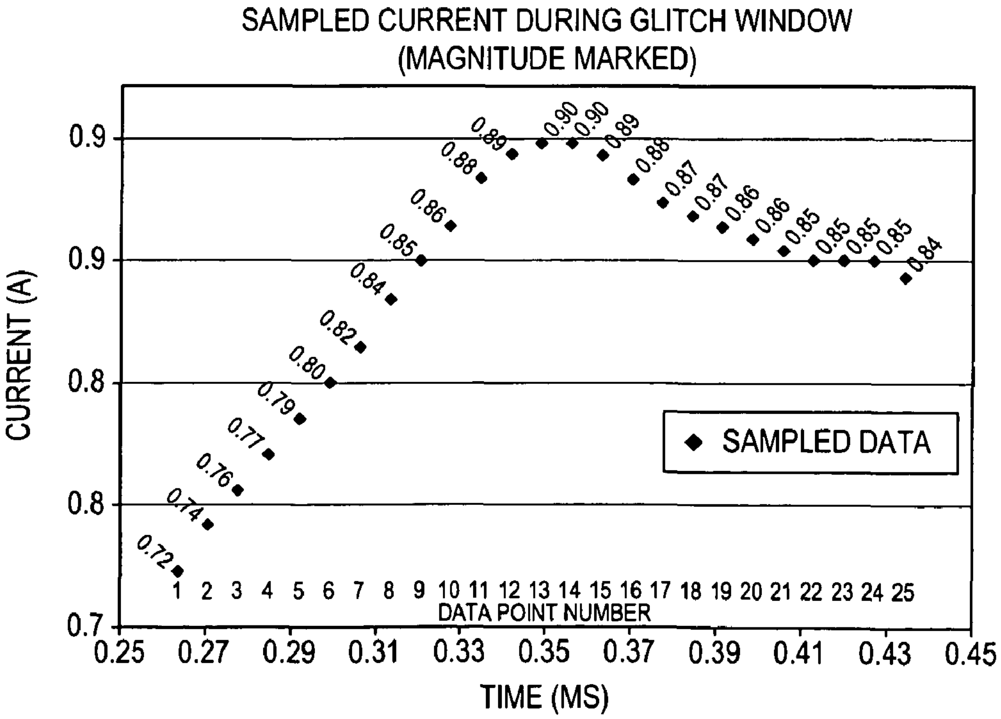

FIG. 15 shows the sampled data points 122 only with the magnitude of the current sample marked for each data point. Each data point has also been numbered as 1 through 25.

Figure 16:
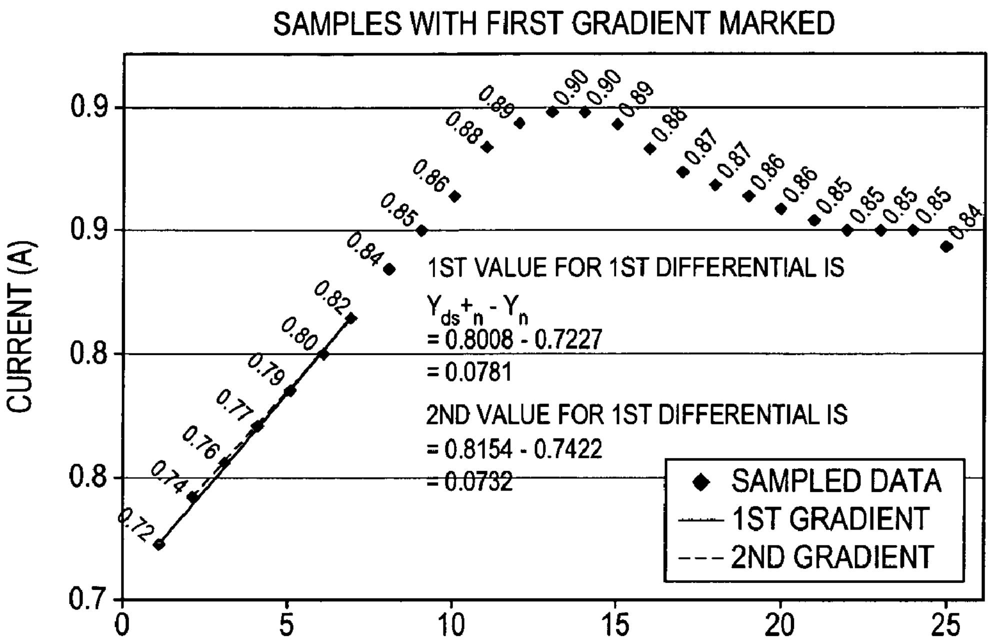
Figure 17:
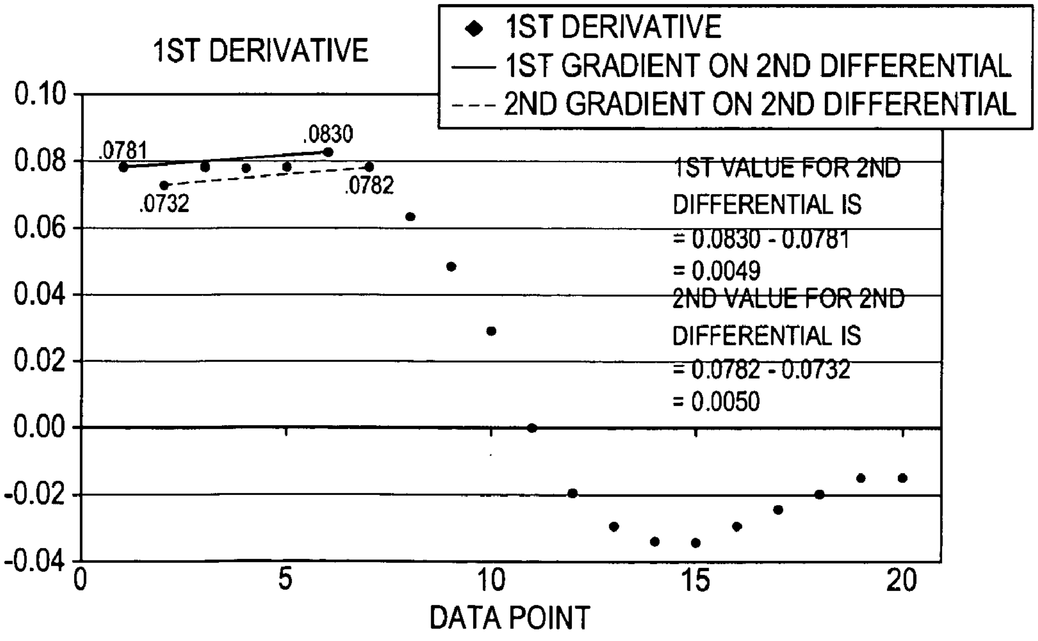
Figure 18:
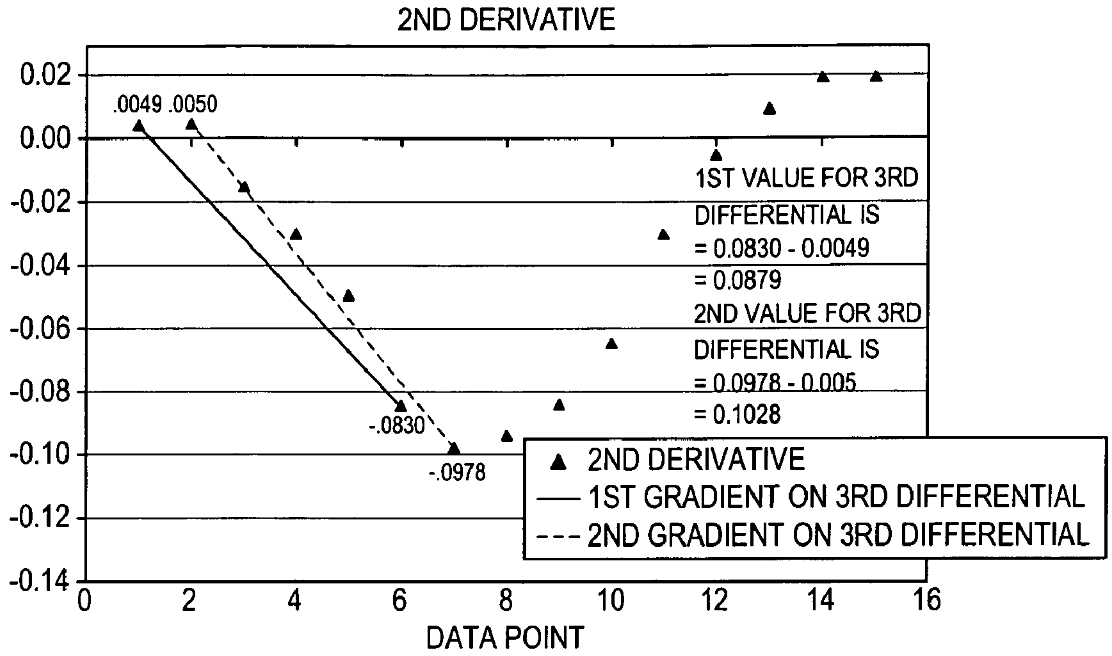

The parameter of differential spacing (ds) may be used to control the amount of filtering or 'smoothing' that is imposed on the data. ds is defined as the number of spaces between sampled points that is used in the differential process. FIG. 16 shows the data samples of FIG. 15 with a differential spacing of 5.

As the gradient between any two points on the current sample is equivalent to the differential at a point halfway between the two, taking the gradient between points spaced ds apart gives the slope at a point halfway between the two. It follows that ds is therefore limited between ds=1 (consecutive points, no filtering) and $$ds = \frac{m}{2}$$

(half the sample size). The gradient between consecutive points would be $$\frac{\Delta y}{\Delta x},$$

which is $$\frac{y_{n+1}-y_n}{x_{n+1}-x_n}$$

(using n as the individual point number from n=1 to n=m.) Using derivative spacing ds, this becomes $$\frac{y_{ds+n}-y_n}{x_{ds+n}-x_n}.$$

With a fixed time interval, over which the samples are taken, which is equivalent to ss (sample spacing), this further reduces the measure of gradient to $$\frac{y_{ds+n}-y_n}{ds\times ss}$$

(for the purposes of illustration, the gradient position can be thought of as $$\frac{ds}{2}+n$$

although this is not used in the actual detection process). Since ds and ss are controlled parameters and fixed during each iteration of the detection loop, they can be ignored. The reason they can be ignored is that the detection process does not need to know the absolute position in time and when ds and ss are fixed, they act effectively as a redundant multiplier of the form $$\frac{1}{ds\times ss}$$

(Note that any thresholds applied for detection rules must take this into account). Thus the measure of gradient reduces to $y_{ds+n}-y_n$. This means that in terms of processing, the derivative calculation becomes a difference of 2 numbers extracted from an array for the y and the x component becomes a constant. In this way both the calculation complexity and the memory requirements for differential generation are reduced.

The derivative calculation for the first two data points in FIG. 16 is shown on the Figure. The derivative calculation can be carried out for all the data points shown in FIG. 16 and the results plotted on a further graph (see FIG. 17).

As noted above FIG. 17 shows a graph of the first derivative values determined from the sampled current values of FIG. 16. In order to obtain the second derivative of the sampled current the derivative calculation described above can be repeated for the data points of FIG. 17. The second derivative calculation for the first two data points in FIG. 17 is shown once again on the figure and it is noted that the calculation can be carried out for all the first derivative data points in FIG. 13 to produce a further graph, shown in FIG. 18, which represents the second derivative with respect to time.

Figure 19:
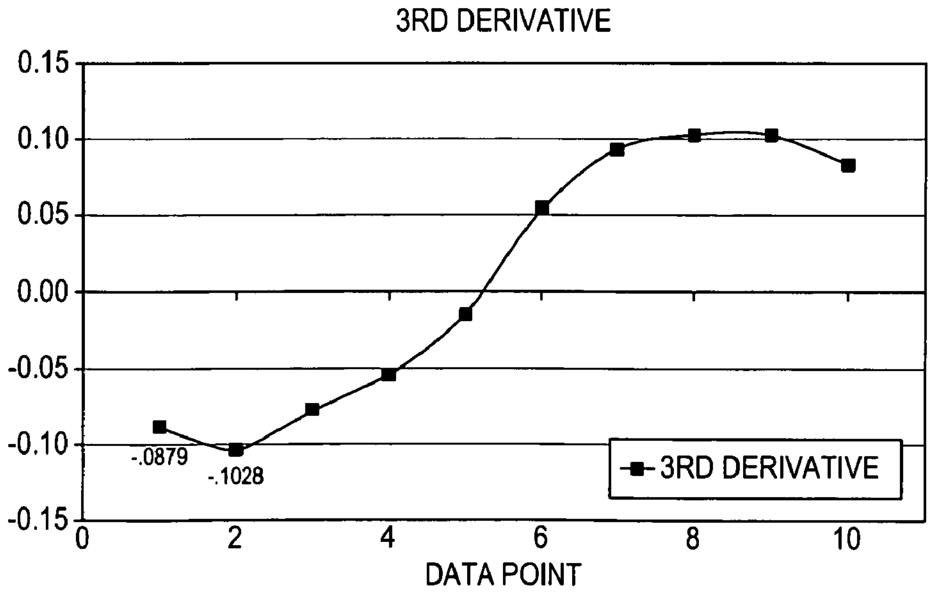

The derivative calculation can be repeated once again on the data points of FIG. 19 in order to derive the third differential of the current profile. This calculation is once again shown for the first two data points on FIG. 18 and the third differential graph that results from this further calculation is shown in FIG. 19.

Figure 20:
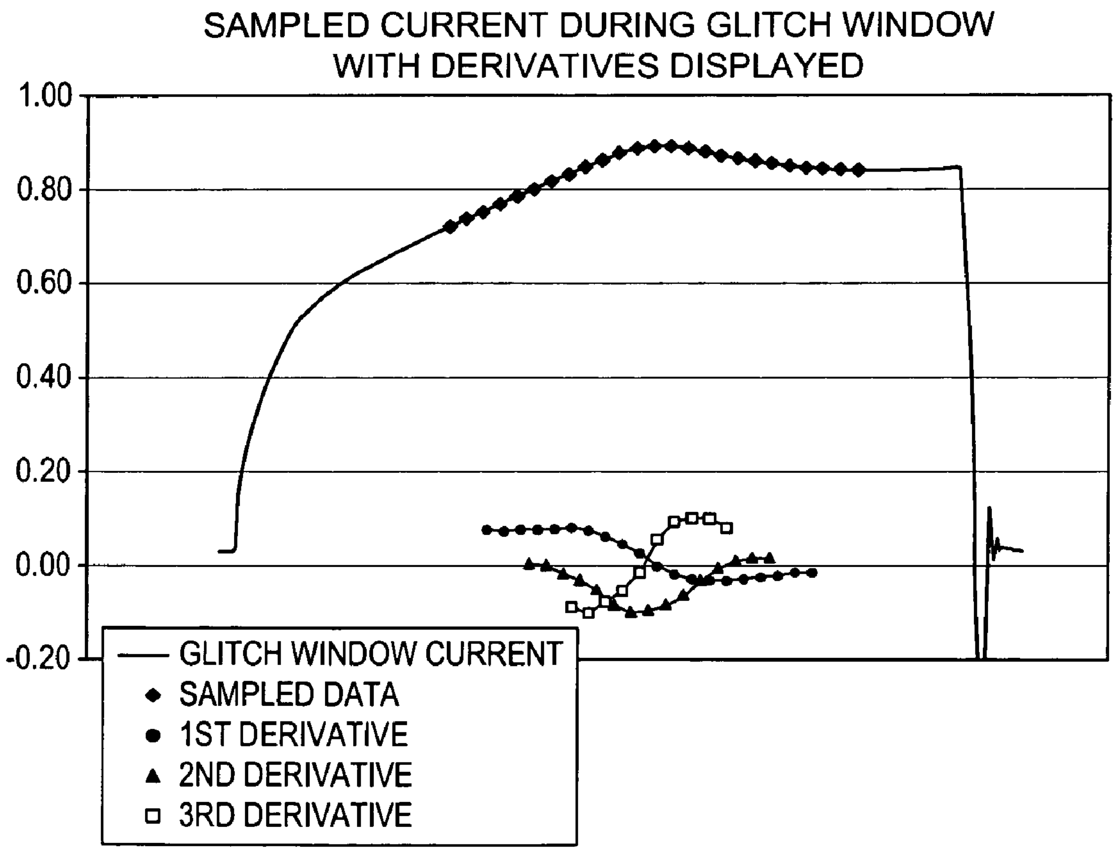

FIG. 20 is a combined graph showing the current sampled during the fault window and the first, second and third derivatives (i.e. a combination of FIGS. 14 to 19). It is noted that the form of the derivative calculation described above will reduce the number of data points at each successive iteration of the process because the calculation relies on taking the difference between two data points and therefore the last five data points will, in the above example where ds=5, not have a corresponding data point to determine a difference value from.

It is noted that the presence of a fault can be determined from FIG. 14 by the presence of a minimum in the second differential. The position of this minimum provides the position of the fault in the injection cycle and this position may be confirmed by analyzing the third differential graph of FIG. 19 for the zero crossing point.

FIGS. 14 to 20 are a visual illustration of the analysis process according to the second embodiment of the present invention using data extracted from the typical waveform given in FIG. 14. Real units of time and current are shown as an aid only. In practice this data may be uncalibrated, having no units and be represented as integer values stored in memory. The integer values may be passed directly from the sampling routine, which minimizes the data handling and manipulation requirements.

The invention utilizes a process of differentiation that includes inherent noise filtering properties that sets it apart from known differentiation methods. The differentiation process is substantially more efficient than previous methods in terms of processing and memory resources and is achieved through the use of non-unit delimited representations of the data and the difference between values being determined using an offset and subtraction technique (effectively a sliding binary mask). The binary mask aspect means that the method is particularly well suited to embedded hardware applications that may not have access to or need floating point capabilities. Instead of looking at the difference between successive data points, the difference between data points that may be several units in time spaced from one another are examined, and it is this feature that introduces the filtering benefit As also noted above, the fault that is detected corresponds to a discrete timing point (i.e. the sharp/discontinuous change to, or of, end of valve movement). Therefore, once the fault has been detected, the detector may output a valve movement signal to, for example, the vehicle's ECU that comprises this discrete timing point.

It will be understood that the embodiments described above are given by way of example only and are not intended to limit the invention, the scope of which is defined in the appended claims. It will also be understood that the embodiments described may be used individually or in combination.

The invention claimed is:

1. A fault detector for detecting valve movement of a valve in a fuel injector of an engine system, the valve comprising an electromagnetic actuator arranged to move the valve between first and second valve positions during a valve cycle, the engine system comprising a sensor for sensing a current through the actuator, the detector comprising:

a controller arranged to control the sensor;

an input for receiving from the sensor data related to the current through the actuator;

a processor arranged to analyze the received data for current discontinuities; and outputs for outputting a valve movement signal in dependence upon the current discontinuities determined by the processor;

wherein the controller is arranged to enable the sensor during a finite sampling window; to move the sampling window from a first window position for a first injection event to a progressively later window position for one or more subsequent injection events; to determine a new sampling window position on the basis of a valve movement signal output for at least two of the preceding window positions; and to feedback, within the controller, the new sampling window position for a subsequent injection event.

2. A detector as claimed in claim 1, wherein subsequent injection events are successive injection events.

3. A detector as claimed in claim 1, wherein subsequent injection events are one of pilot, main or post injection events within successive injection cycles.

4. A detector as claimed in claim 1, wherein the new sampling window position is determined as a median position of at least two of the preceding window positions, for which a valve movement signal is output.

5. A detector as claimed in claim 1, wherein the sensor is arranged to sample the current at a plurality of sample points during the sampling window.

6. A detector as claimed in claim 1, wherein the current parameter is the current through the sensing resistor.

7. A detector as claimed in claim 1, wherein the sensor is arranged to sense the current through the actuator.

8. A detector as claimed in claim 1, wherein the sensor comprises a sensing resistor and the data received at the inputs is related to the current through the sensing resistor or the voltage across the sensing resistor.

9. A detector as claimed in claim 1, wherein the valve cycle comprises a pull-in region, during which a first voltage potential is applied across the actuator so that the valve is caused to move from a first state to a second state and a hold region, during which a second voltage potential or series of pulses at a second voltage potential is applied across the actuator.

10. A detector as claimed in claim 9, wherein the controller is arranged to enable the sensor between the pull-in and hold regions of the valve cycle.

11. A detector as claimed in claim 9, wherein the controller is arranged to enable the sensor after the hold region of the valve cycle.

12. A detector as claimed in claim 11, wherein the controller is arranged to output a control signal to one or more control switches in order to isolate the actuator from a power supply and to open a current path comprising the actuator and the sensor.

13. A detector as claimed in claim 9, wherein the controller is arranged to progressively move the sampling window away from the end of the hold region in successive injection cycles.

14. A detector as claimed in claim 1, wherein the processor is arranged to analyze the received data by determining the second derivative of the current through the actuator with respect to time.

15. A detector as claimed in claim 14, wherein the processor is arranged to determine the presence of a current discontinuity if a maxima or minima is detected in the second derivative of the current through the actuator.

16. A detector as claimed in either claim 14, wherein the processor is arranged to determine the presence of a current discontinuity if the second derivative of the current through the actuator exceeds a threshold value.

17. A detector as claimed in claim 16, wherein the processor is arranged to determine the presence of a current discontinuity if the second derivative of the current through the actuator exceeds a threshold value for a set period of time.

18. A detector as claimed in claim 14, wherein the processor is arranged to determine the location of the current discontinuity by determining the third derivative of the current, I, with respect to time, the location of the discontinuity being equal to the time when d3I/dt3=0.

19. A detector as claimed in claim 1, wherein the valve movement signal output by the detector is the location with respect to time of the current discontinuities.

20. A method of detecting valve movement of a valve in a fuel injector of an engine system, the valve comprising an electromagnetic actuator that is arranged to move the valve between first and second positions during a valve cycle, the method comprising:

sampling the current through the actuator during a finite sampling window with a controller, analyzing the sampled current for current discontinuities with the controller, and determining valve movements in dependence upon the current discontinuities with the controller, wherein the sampling window is moved from a first window position for a first injection event to a progressively later window position for one or more subsequent injection events, and in that the method further comprises calculating a new sampling window position on the basis of a fault detect signal output for at least two of the preceding window positions; and feeding back, within the controller, the new sampling window position for a subsequent injection event.

21. A computer program on a computer readable memory or storage device for execution by a computer, the computer program comprising a computer program software portion that, when executed, is operable to implement a method of claim 20.

22. An engine control unit for a vehicle comprising a detector for detecting valve movement of a valve in a fuel injector of an engine system, the valve comprising an electromagnetic actuator arranged to move the valve between first and second valve positions during a valve cycle, the engine system comprising a sensor for sensing a current through the actuator, the detector comprising:

a controller arranged to control the sensor;

an input for receiving from the sensor data related to the current through the actuator;

a processor arranged to analyze the received data for current discontinuities; and outputs for outputting a valve movement signal in dependence upon the current discontinuities determined by the processor;

wherein the controller is arranged to enable the sensor during a finite sampling window; to move the sampling window from a first window position for a first injection event to a progressively later window position for one or more subsequent injection events; to determine a new sampling window position on the basis of a valve movement signal output for at least two of the preceding window positions; and to feedback, within the controller, the new sampling window position for a subsequent injection event.

* * * * *